(12) United States Patent
Kimura et al.

(10) Patent No.: US 9,831,521 B2
(45) Date of Patent: Nov. 28, 2017

(54) NONAQUEOUS ELECTROLYTIC STORAGE ELEMENT

(71) Applicants: Okitoshi Kimura, Kanagawa (JP); Nobuaki Onagi, Kanagawa (JP); Eiko Hibino, Kanagawa (JP); Hisamitsu Kamezaki, Kanagawa (JP); Anna Hirowatari, Kanagawa (JP); Yasunori Sugimoto, Kanagawa (JP)

(72) Inventors: Okitoshi Kimura, Kanagawa (JP); Nobuaki Onagi, Kanagawa (JP); Eiko Hibino, Kanagawa (JP); Hisamitsu Kamezaki, Kanagawa (JP); Anna Hirowatari, Kanagawa (JP); Yasunori Sugimoto, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 36 days.

(21) Appl. No.: 14/648,989

(22) PCT Filed: Dec. 12, 2013

(86) PCT No.: PCT/JP2013/083998
§ 371 (c)(1),
(2) Date: Jun. 2, 2015

(87) PCT Pub. No.: WO2014/103849
PCT Pub. Date: Jul. 3, 2014

(65) Prior Publication Data
US 2015/0303512 A1    Oct. 22, 2015

(30) Foreign Application Priority Data
Dec. 28, 2012  (JP) ................................. 2012-287384

(51) Int. Cl.
*H01M 10/0525* (2010.01)
*H01M 10/052* (2010.01)
(Continued)

(52) U.S. Cl.
CPC ....... *H01M 10/0525* (2013.01); *H01M 4/133* (2013.01); *H01M 4/583* (2013.01);
(Continued)

(58) Field of Classification Search
None
See application file for complete search history.

(56) References Cited

U.S. PATENT DOCUMENTS

2004/0131940 A1* 7/2004 Suzuki .................. H01M 4/133
                                                                429/231.95
2004/0179328 A1   9/2004 Ando et al.
(Continued)

FOREIGN PATENT DOCUMENTS

CN      1619875 A    5/2005
JP      8-77997 A    3/1996
(Continued)

OTHER PUBLICATIONS

Dahn et al, Energy and capacity projections for practical dual-graphite cells, 2000, J electrochem soc, 147, pp. 899-901.*
(Continued)

*Primary Examiner* — Daniel Gatewood
(74) *Attorney, Agent, or Firm* — Oblon, McClelland, Maier & Neustadt, L.L.P.

(57) ABSTRACT

To provide a nonaqueous electrolytic storage element, which contains: a positive electrode, which contains a positive electrode material layer including a positive electrode active material capable of reversibly accumulating and releasing anions; a negative electrode, which contains a negative electrode material layer including a negative electrode active material capable of reversibly accumulating and releasing cations; a separator provided between the positive electrode and the negative electrode; and a nonaqueous electrolyte containing an electrolyte salt, wherein a pore volume of the
(Continued)

negative electrode material layer per unit area of the negative electrode is larger than a pore volume of the positive electrode material layer per unit area of the positive electrode.

9 Claims, 1 Drawing Sheet

(51) Int. Cl.
  *H01M 4/583* (2010.01)
  *H01M 4/587* (2010.01)
  *H01M 4/133* (2010.01)
  *H01M 10/0566* (2010.01)
  *H01M 4/02* (2006.01)
  *H01M 10/42* (2006.01)

(52) U.S. Cl.
  CPC ......... *H01M 4/587* (2013.01); *H01M 10/052* (2013.01); *H01M 10/0566* (2013.01); *H01M 2004/021* (2013.01); *H01M 2010/4292* (2013.01)

(56) References Cited

U.S. PATENT DOCUMENTS

| | | | |
|---|---|---|---|
| 2006/0024579 A1* | 2/2006 | Kolosnitsyn | H01M 4/13 429/209 |
| 2006/0269834 A1 | 11/2006 | West et al. | |
| 2006/0292447 A1 | 12/2006 | Suzuki et al. | |
| 2007/0148548 A1 | 6/2007 | Suzuki et al. | |
| 2009/0226797 A1 | 9/2009 | Yoshitake et al. | |
| 2012/0003534 A1 | 1/2012 | Sheem et al. | |
| 2012/0288751 A1 | 11/2012 | Kako et al. | |
| 2012/0321947 A1* | 12/2012 | Goto | H01M 4/131 429/211 |
| 2013/0288113 A1 | 10/2013 | Onagi et al. | |

FOREIGN PATENT DOCUMENTS

| | | |
|---|---|---|
| JP | 11-102729 | 4/1999 |
| JP | 2001-076756 | 3/2001 |
| JP | 2002-260633 | 9/2002 |
| JP | 2002-319404 | 10/2002 |
| JP | 3368918 | 11/2002 |
| JP | 2003-077544 | 3/2003 |
| JP | 2003-272609 | 9/2003 |
| JP | 2003-331825 | 11/2003 |
| JP | 2003331825 A * | 11/2003 |
| JP | 2004-134295 | 4/2004 |
| JP | 2004-134658 | 4/2004 |
| JP | 2005-100706 | 4/2005 |
| JP | 2005-251472 | 9/2005 |
| JP | 2005-259378 | 9/2005 |
| JP | 2006-351249 | 12/2006 |
| JP | 2006-351306 | 12/2006 |
| JP | 2007-042525 | 2/2007 |
| JP | 2007-080573 | 3/2007 |
| JP | 4015993 | 9/2007 |
| JP | 2007-299698 | 11/2007 |
| JP | 2007-305522 | 11/2007 |
| JP | 2007-305625 | 11/2007 |
| JP | 2007-305626 | 11/2007 |
| JP | 2008-071860 | 3/2008 |
| JP | 2008-084772 | 4/2008 |
| JP | 2008-091726 | 4/2008 |
| JP | 2008-117623 | 5/2008 |
| JP | 2008-117905 | 5/2008 |
| JP | 2008-123798 | 5/2008 |
| JP | 2008-124012 | 5/2008 |
| JP | 2008-159315 | 7/2008 |
| JP | 2008-159316 | 7/2008 |
| JP | 2008-166268 | 7/2008 |
| JP | 2008-181732 | 8/2008 |
| JP | 2008-543002 | 11/2008 |
| JP | 2008-300593 | 12/2008 |
| JP | 2008-305648 | 12/2008 |
| JP | 2008-305928 | 12/2008 |
| JP | 2009-088131 | 4/2009 |
| JP | 2009-187753 | 8/2009 |
| JP | 4392169 | 10/2009 |
| JP | 2010-034412 | 2/2010 |
| JP | 2010-040180 | 2/2010 |
| JP | 4516845 | 5/2010 |
| JP | 2010-161244 | 7/2010 |
| JP | 2010-177284 | 8/2010 |
| JP | 2010-200476 | 9/2010 |
| JP | 2010-254537 | 11/2010 |
| JP | 2011-096672 | 5/2011 |
| JP | 2011-171177 | 9/2011 |
| JP | 2012-015086 | 1/2012 |
| JP | 4928828 | 2/2012 |
| JP | 2012-049142 | 3/2012 |
| JP | 4948109 | 3/2012 |
| JP | 2012-099225 | 5/2012 |
| JP | 5002188 | 5/2012 |
| JP | 2012-253010 | 12/2012 |
| JP | 2014-096528 | 5/2014 |
| JP | 2014-112524 | 6/2014 |
| WO | WO 02/093666 A1 | 11/2002 |
| WO | WO 2004/034491 A1 | 4/2004 |
| WO | WO 2006/003858 A1 | 1/2006 |
| WO | WO 2007/132896 A1 | 11/2007 |
| WO | WO 2010/013726 A1 | 2/2010 |
| WO | WO 2011/036759 A1 | 3/2011 |
| WO | WO 2014/073712 A1 | 5/2014 |

OTHER PUBLICATIONS

Extended European Search Report issued on Nov. 23, 2015 in European Patent Application No. 13867010.4.
J. A. Seel, et al., "Electrochemical Intercalation of $PF_6$ into Graphite", Journal of the Electrochemical Society, XP-002736115, vol. 147, No. 3, Mar. 1, 2000, pp. 892-898.
Tatsumi Ishihara, et al., "Intercalation of $PF_6$-anion into graphite carbon with nano pore for dual carbon cell with high capacity", Journal of Power Sources, vol. 196, No. 16, Nov. 15, 2010, pp. 6956-6959.
Office Action issued on May 26, 2016 in Korean Patent Application No. 10-2015-7017905 with English translation.
U.S. Appl. No. 14/649,434, filed Jun. 3, 2015, Hirowatari, et al.
U.S. Appl. No. 14/649,434, filed Jun. 3, 2015 Inventor: Hirowatari, et al.
International Search Report Issued Apr. 8, 2014 in PCT/JP2013/083998 filed Dec. 12, 2013.
J. R. Dahn et al "Energy and Capacity Projections for Practical Dual-Graphite Cells", Journal of the Electrochemical Society, 147(3) 899-901(2000).
Combined Office Action and Search Report issued on Mar. 20, 2017 in Chinese Patent Application No. 201380073246.5 with English translation.

* cited by examiner

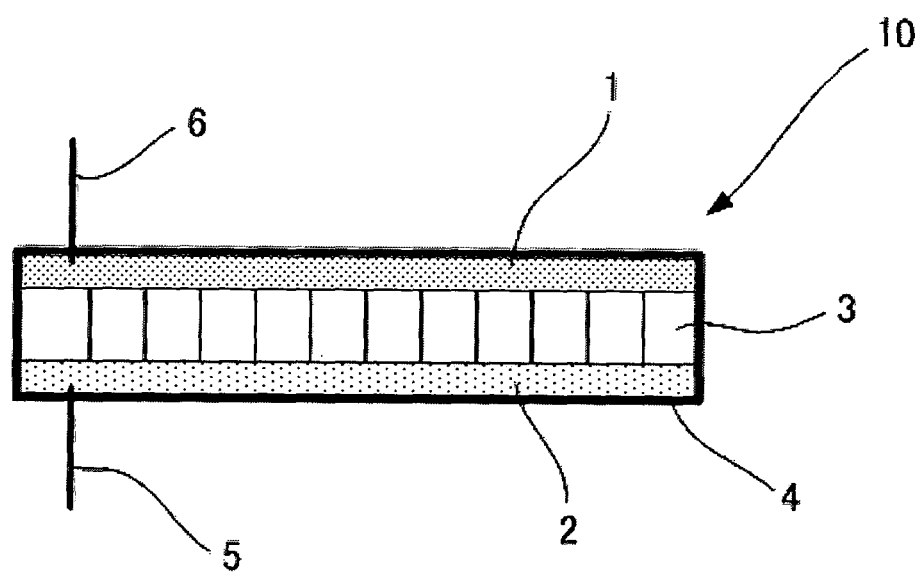

NONAQUEOUS ELECTROLYTIC STORAGE ELEMENT

TECHNICAL FIELD

The present invention relates to a nonaqueous electrolytic storage element.

BACKGROUND ART

In recent years, accompanied by downsizing and enhanced performance of mobile devices, a nonaqueous electrolytic storage element has improved properties as a nonaqueous electrolyte storage element having high energy density and become widespread. Also, attempts are underway to improve gravimetric energy density of the nonaqueous electrolytic storage element, aiming to expand its application to electric vehicles.

Conventionally, a lithium ion nonaqueous electrolytic storage element including a positive electrode of a lithium-cobalt composite oxide, a negative electrode of carbon, and a nonaqueous electrolyte obtained by dissolving lithium salt in a nonaqueous solvent has been widely used as the nonaqueous electrolytic storage element.

Meanwhile, there is a nonaqueous electrolytic storage element, which is charged and discharged by intercalation or deintercalation of anions in a nonaqueous electrolyte to a positive electrode of a material, such as an electroconductive polymer, and a carbonaceous material, and by intercalation or deintercalation of lithium ions in the nonaqueous electrolyte to a negative electrode of a carbonaceous material (this type of battery may be referred to as "dual carbon battery cell" hereinafter) (see PTL 1).

In the dual carbon battery cell, as indicated by the following reaction formula, the cell is charged by intercalation of anions such as $PF_6^-$ from the nonaqueous electrolyte to the positive electrode and by intercalation of $Li^+$ from the nonaqueous electrolyte to the negative electrode, and the cell is discharged by deintercalation of anions such as $PF_6^-$ and so on from the positive electrode and deintercalation of $Li^+$ from the negative electrode to the nonaqueous electrolyte.

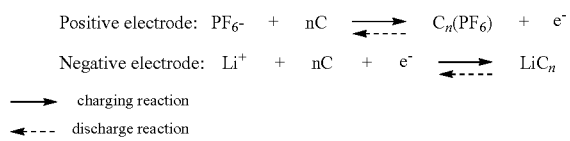

Positive electrode: $PF_6^-$ + $nC$ ⇌ $C_n(PF_6)$ + $e^-$

Negative electrode: $Li^+$ + $nC$ + $e^-$ ⇌ $LiC_n$

→ charging reaction
←--- discharge reaction

A discharge capacity of the dual carbon battery cell is determined by an anion storage capacity of the positive electrode, an amount of possible anion release of the positive electrode, a cation storage amount of the negative electrode, an amount of possible cation release of the negative electrode, and an amount of anions and amount of cations in the nonaqueous electrolyte. Accordingly, in order to improve the discharge capacity of the dual carbon battery cell, it is necessary to increase not only a positive electrode active material and a negative electrode active material, but also an amount of the nonaqueous electrolyte containing lithium salt (see NPL 1).

In the manner as described above, a nonaqueous electrolytic storage element, in which charging is performed by accumulating anions from a nonaqueous electrolyte to a positive electrode, and accumulating cations from the nonaqueous electrolyte to a negative electrode, and discharging is performed by releasing anions from the positive electrode and cations from the negative electrode, requires a sufficient amount of an electrolyte salt. It is important to provide a nonaqueous electrolyte in a limited volume of a nonaqueous electrolytic storage element in order to improve a volume energy density of a storage element. When a separator is designed to have a thick thickness to include a sufficient amount of a nonaqueous electrolyte, however, a problem that the energy density is reduced is caused.

In a nonaqueous electrolytic storage element using a lithium accumulating and/or releasing positive electrode, such as an oxide complex positive electrode, and a lithium accumulating and/or releasing negative electrode, such as graphite, a concentration of an electrolyte salt is not substantially changed with charging and discharging. Therefore, a density of an electrode is set high to pack a large amount of a storing material inside a storage element (to increase an energy density of the storing element), which lowers a porosity of the electrode. In a case where an storage element is composed to have the same structure to that of such storage element where a density of the electrolyte salt is not substantially changed with charging and discharging, an amount of a nonaqueous electrolyte that can be included inside the storage element is reduced, and there is a problem that a sufficient charging capacity and discharging capacity cannot be attained as a concentration of the electrolyte salt is reduced. When a thickness of a separator is increased to substantially increase an amount of a nonaqueous electrolyte to solve the aforementioned problem, an energy density of a nonaqueous electrolytic storage element is reduced by an increased amount of the separator, which does not contribute to storage of electricity.

Further, in a case where a concentration of an electrolyte salt is made high. i.e., about 3 mol/L, in a nonaqueous electrolytic storage element using a type of electrode where anions are stored in a positive electrode, and a case where the storage element is charged to high voltage, there is a problem that a capacity of the storage element is reduced.

Accordingly, it is desired to provide a nonaqueous electrolytic storage element, which realizes a high energy density and have an improved charging-discharging cycle properties.

CITATION LIST

Patent Literature

PTL 1: Japanese Patent Application Laid-Open (JP-A) No. 2005-251472

Non-Patent Literature

NPL 1: Journal of The Electrochemical Society, 147(3) 899-901 (2000)

SUMMARY OF INVENTION

Technical Problem

The present invention aims to provide a nonaqueous electrolytic storage element, which realizes a high energy density and have an improved charging-discharging cycle properties.

Solution to Problem

As the means for solving the aforementioned problem, the nonaqueous electrolytic storage element of the present invention contains:

a positive electrode, which contains a positive electrode material layer including a positive electrode active material capable of reversibly accumulating and releasing anions;

a negative electrode, which contains a negative electrode material layer including a negative electrode active material capable of reversibly accumulating and releasing cations;

a separator provided between the positive electrode and the negative electrode; and a nonaqueous electrolyte containing an electrolyte salt, wherein a pore volume of the negative electrode material layer per unit area of the negative electrode is larger than a pore volume of the positive electrode material layer per unit area of the positive electrode.

Advantageous Effects of Invention

The present invention can solve the aforementioned various problems in the art and can provide a nonaqueous electrolytic storage element, which realizes a high energy density and have an improved charging-discharging cycle properties.

BRIEF DESCRIPTION OF DRAWINGS

FIG. 1 is a schematic diagram illustrating one example of the nonaqueous electrolytic storage element of the present invention.

DESCRIPTION OF EMBODIMENTS (Nonaqueous Electrolytic Storage Element)

The nonaqueous electrolytic storage element of the present invention contains a positive electrode, a negative electrode, a nonaqueous electrolyte, and a separator, and may further contain other members according to the necessity.

The nonaqueous electrolytic storage element is appropriately selected depending on the intended purpose without any limitation, and examples thereof include a nonaqueous electrolyte secondary battery, and a nonaqueous electrolyte capacitor.

The present inventors diligently studied about a mechanism of a phenomenon that a capacity of a nonaqueous electrolytic storage element using a type of an electrode in which anions are accumulated as a positive electrode, when an amount of an electrolyte salt in a nonaqueous electrolyte is made high, i.e., about 3 mol/L, and when the storage element is charged to high voltage. As a result, they have found that a factor for causing the aforementioned phenomenon is that a fluorine component generated from decomposition of $PF_6^-$, which is an anion, forms a film on an electrode (especially negative electrode) when $LiPF_6$ is used as an electrolyte salt. When the nonaqueous electrolytic storage element is charged, $LiPF_6$ in the nonaqueous electrolyte is dissociated, and $PF_6^-$, which is an anion, is inserted into the positive electrode. During this process, part of $PF_6^-$ is decomposed to release fluorine ions. The fluorine ion dissociated from $PF_6^-$ reacts with lithium to become LiF and to cover a surface of the electrode. As a result, the internal resistance is increased, and therefore deterioration, such as reduction in a capacity of the storage element, is caused. The present inventors dismantled a cell after repetitive charging and discharging and analyzed the negative electrode. As a result, the presence of LiF was confirmed. It has been found that this phenomenon is caused when a fluorine-based electrolyte salt is used.

The present inventors have further conducted researches based on the aforementioned insights. As a result, they have found that increasing a space (voids) in a negative electrode material layer of a negative electrode serving as a space for retaining a nonaqueous electrolyte, preferably making a capacity of the negative electrode larger than a capacity of a positive electrode, is effective for realizing high energy density, and improving charging-discharging cycle properties.

Accordingly, the nonaqueous electrolytic storage element of the present invention is formed so that a pore volume of the negative electrode material layer per unit area of the negative electrode is larger than a pore volume of the positive electrode material layer per unit area of the positive electrode.

The pore volume ratio is appropriately selected depending on the intended purpose without any limitation, provided that the pore volume of the negative electrode material layer per unit area of the negative electrode is larger than the pore volume of the positive electrode material layer per unit area of the positive electrode. The pore volume ratio is preferably 1.05 times to 5 times, more preferably 1.5 times to 3 times. When the pore volume ratio (the pore volume of the negative electrode material layer/the pore volume of the positive electrode material layer) is less than 1.05 times, a capacity may be reduced due to lack of the nonaqueous electrolyte. When the pore volume ratio is more than 5 times, an energy density is reduced.

The pore volume of the negative electrode material layer per unit area of the negative electrode means a volume of pores contained in the negative electrode material layer, for example, when the negative electrode material is formed on a negative electrode collector of the negative electrode by coating. The definition of the pore volume of the positive material layer per unit area of the positive electrode is also the same.

Here, the pore volume of the negative electrode material layer per unit area of the negative electrode and the pore volume of the positive electrode material layer per unit area of the positive electrode can be measured, for example, by means of a mercury porosimeter or a pycnometer (a gas displacement method).

In the present invention, it is important to increase an amount of an electrolyte salt in a nonaqueous electrolyte, i.e., to increase a volume of a negative electrode material layer of the negative electrode to store the nonaqueous electrolyte, in order to realize a high energy density. The nonaqueous electrolyte can be stored in pores of the positive electrode material layer (excluding a positive electrode collector), pores of the negative electrode material layer (excluding a negative electrode collector), and the separator. However, it is not preferred that a volume of the separator be increase as the separator does not contribute to a storage of electricity. Accordingly, a pore volume V1 of the positive electrode material layer per unit area of the positive electrode, a pore volume V2 of the negative electrode material layer per unit area of the negative electrode, and a pore volume V3 per unit area of the separator preferably satisfy the following formula: $V3<V1<V2$.

Porosities of the positive electrode material layer and the negative electrode material layer are appropriately selected depending on the intended purpose without any limitation, provided that they are not such porosities that are lower than a pore volume of the separator. The porosity of the positive electrode material layer and the porosity of the negative electrode material layer are both preferably 0.4 to 0.7, more preferably 0.5 to 0.65 for retaining an electrolyte salt, and securing strength. When the porosity thereof is less than 0.4, a volume to include the nonaqueous electrolyte is reduced.

Therefore, it is necessary to increase a concentration of the electrolyte salt to maintain a capacity of the storage element. As the concentration of the electrolyte salt is increased, however, increase in resistance, deterioration of properties at low temperature, and decomposition of the electrolyte salt at the positive electrode may be encouraged. When the porosity thereof is more than 0.7, the electrode itself may become fragile.

Here, the porosity of the positive electrode material layer and the porosity of the negative electrode material layer can be each calculated by dividing a "pore volume" determined by means of a mercury porosimeter or a pycnometer with a "volume obtained by multiplying a geometric area of the electrode by a thickness of the electrode material layer."

Regarding a relationship of a capacity of the positive electrode and a capacity of the negative electrode, it is necessary to inhibit the reduction of the capacity due to deterioration of the negative electrode in order to maintain stability of repetitive charging and discharging. The larger capacity of the negative electrode per unit area than the capacity of the positive negative electrode per unit area is effective for preventing a reduction in a discharge capacity due to repetitive cycles of charging and discharging.

The capacity ratio (the capacity of the negative electrode/the capacity of the positive electrode) is appropriately selected depending on the intended purpose without any limitation, provided that the capacity of the negative electrode is larger than the positive electrode, but it is preferably 2 times to 6 times. When the capacity ratio (the capacity of the negative electrode/the capacity of the positive electrode) is less than 2 times, a space for retaining the nonaqueous electrolyte becomes insufficient, and it is necessary to improve the capacity with increasing the electrolyte salt concentration, in order to compensate the insufficient space. When the electrolyte salt concentration is high, however, it is not desirable because increase in resistance, deterioration in properties at low temperature, and decomposition of the electrolyte salt at the positive electrode are encouraged. When the capacity ratio (the capacity of the negative electrode/the capacity of the positive electrode) is more than 6 times, a capacity is improved by retaining a sufficient amount of the nonaqueous electrolyte and charging-discharging cycle properties are maintained, but an energy density of the storage element itself is reduced.

Here, the volume of the positive electrode per unit area and the volume of the negative electrode per unit area can be measured, for example, by means of a commercially available charge-discharge device. The capacity per unit area is a capacity with respect to a geometric area of the electrode. The capacity of the positive electrode can be measured by charging up to a predetermined upper voltage with using lithium as a counter electrode, and discharging to a predetermined voltage. The predetermined voltage is based on a charging and discharging method when the nonaqueous electrolytic storage element is composed. The capacity of the negative electrode can be measured by charging to 0 V using lithium as a counter electrode, followed by discharging to 1.5 V.

Moreover, it is preferred that cations be accumulated in the negative electrode active material of the negative electrode in advance, for the purpose of further improving charging-discharging cycle properties of charging and discharging. Specifically, it is preferred that, after forming the negative electrode material layer on a surface of a negative electrode collector, a predetermined amount of cations be accumulated in the negative electrode active material of the negative electrode. As for the accumulated amount, it is preferred that at least an electrical capacity corresponding to a capacity of the positive electrode be accumulated, and it is more preferred that cations corresponding to 0.1 V be accumulated with respect to a lithium electrode described later.

A method for accumulating cations (e.g., lithium ions) in the negative electrode active material in advance is appropriately selected depending on the intended purpose without any limitation, and examples thereof include a mechanical charging method, an electrochemical charging method, and a chemical charging method.

In accordance with the mechanical charging method, charging is performed, for example, by mechanically bringing the negative electrode active material in contact with a material having lower electric potential than the negative electrode active material (such as metal lithium). More specifically, after bonding a predetermined amount of metal lithium to a surface of the negative electrode, or directing forming a film of metal lithium on a surface of the negative electrode through a vacuum process, such as vapor deposition, or transferring lithium metal, which is formed on a mold-releasing processed plastic substrate, onto a surface of the negative electrode, charging can be performed. In the mechanical charging method, moreover, after bringing a material having lower electric potential than the negative electrode active material into contact with a surface of the negative electrode, a progress of a charging reaction is accelerated by heating the negative electrode so that the duration required for the charging reaction can be shortened.

In accordance with the electrochemical charging method, the negative electrode is charged, for example, by immersing the negative electrode and the counter electrode in the electrolyte, and applying electric current between the negative electrode and the counter electrode. As for the counter electrode, for example, metal lithium can be used. As for the electrolyte, for example, a nonaqueous solvent, in which a lithium salt is dissolved, can be used.

By making a pore volume of the negative electrode material layer per unit area of the negative electrode larger than a pore volume of the positive electrode material layer per unit area of the positive electrode, preferably making a capacity per unit area pf the negative electrode larger than a capacity per unit area of the positive electrode, a high energy density can be realized under the conditions including high charging termination voltage of 5.2 V and a high concentration electrolyte where a concentration of an electrolyte salt is 3 mol/L, and a reduction in a capacity of the storage element after repetitive charging and discharging can be prevented.

A positive electrode, a negative electrode, a nonaqueous electrolyte, and a separator of the nonaqueous electrolytic storage element are sequentially explained hereinafter.

<Positive Electrode>

The positive electrode is appropriately selected depending on the intended purpose without any limitation, provided that the positive electrode contains a positive electrode active material. Examples of the positive electrode include a positive electrode, which contains a positive electrode material layer containing a positive electrode active material, provided on a positive electrode collector.

A shape of the positive electrode is appropriately selected depending on the intended purpose without any limitation, and examples thereof include a plate shape.

<<Positive Electrode Material Layer>>

The positive electrode material layer is appropriately selected depending on the intended purpose without any limitation. For example, the positive electrode material layer contains at least a positive electrode active material, and may further contain an electroconductive agent, a binder, a thickener, etc. according to necessity.

—Positive Electrode Active Material—

The positive electrode active material is appropriately selected depending on the intended purpose without any limitation, provided that it is a material capable of reversibly accumulating and releasing anions. Examples thereof include a carbonaceous material, and an electroconductive polymer. Among them, a carbonaceous material is particularly preferable because of its high energy density.

Examples of the electroconductive polymer include polyaniline, polypyrrole, and polyparaphenylene.

Examples of the carbonaceous material include: black-lead (graphite), such as coke, artificial graphite, natural graphite; and a thermal decomposition product of an organic material under various thermal decomposition conditions. Among them, artificial graphite, and natural graphite are particularly preferable.

The carbonaceous material is preferably a carbonaceous material having high crystallinity. The crystallinity can be evaluated by X-ray diffraction, or Raman analysis. For example, in a powder X-ray diffraction pattern thereof using CuKα rays, the intensity ratio $I_{2\theta=22.3°}/I_{2\theta=26.4°}$ of the diffraction peak intensity $I_{2\theta=22.3°}$ at $2\theta=22.3°$ to the diffraction peak intensity $I_{2\theta=26.4°}$ at $2\theta=26.4°$ is preferably 0.4 or less.

A BET specific surface area of the carbonaceous material as measured by nitrogen adsorption is preferably 1 $m^2/g$ to 100 $m^2/g$. The average particle diameter (median diameter) of the carbonaceous material as measured by a laser diffraction-scattering method is preferably 0.1 μm to 100 μm.

—Binder—

The binder is appropriately selected depending on the intended purpose without any limitation, provided that the binder is a material stable to a solvent or electrolytic solution used during the production of an electrode. Examples of the binder include: a fluorine-based binder, such as polyvinylidene fluoride (PVDF), and polytetrafluoroethylene (PTFE); styrene-butadiene rubber (SBR); and isoprene rubber. These may be used alone, or in combination.

—Thickener—

Examples of the thickener include carboxy methyl cellulose (CMC), methyl cellulose, hydroxymethyl cellulose, ethyl cellulose, polyvinyl alcohol, oxidized starch, starch phosphate, and casein. These may be used alone, or in combination.

—Electroconductive Agent—

Examples of the electroconductive agent include: a metal material, such as copper, and aluminum; and a carbonaceous material, such as carbon black, and acetylene black. These may be used alone, or in combination.

The average thickness of the positive electrode material layer is appropriately selected depending on the intended purpose without any limitation, but it is preferably 20 μm to 300 μm, more preferably 40 μm to 150 μm. When the average thickness thereof is less than 20 μm, an energy density of a resulting element may be reduced. When the average thickness thereof is greater than 300 μm, negative charge properties may be degraded.

<<Positive Electrode Collector>>

A material, shape, size, and structure of the positive electrode collector are appropriately selected depending on the intended purpose without any limitation.

The material of the positive electrode collector is appropriately selected depending on the intended purpose without any limitation, provided that it is composed of an electroconductive material. Examples thereof include stainless steel, nickel, aluminum, copper, titanium, and tantalum. Among them, stainless steel and aluminum are particularly preferable.

The shape of the positive electrode collector is appropriately selected depending on the intended purpose without any limitation.

The size of the positive electrode collector is appropriately selected depending on the intended purpose without any limitation, provided that it is a size appropriately used as an nonaqueous electrolytic storage element.

—Preparation Method of Positive Electrode—

The positive electrode can be produced by applying a positive electrode material, which has been formed into slurry by appropriately adding the binder, the thickener, and the electroconductive agent, and a solvent to the positive electrode active material, onto the positive electrode collector, followed by drying. The solvent is appropriately selected depending on the intended purpose without any limitation, and examples thereof include an aqueous solvent, and an organic solvent. Examples of the aqueous solvent include water and alcohol. Examples of the organic solvent include N-methyl-2-pyrrolidone (NMP), and toluene.

Note that, the positive electrode active material may be subjected to roll molding as it is to form a sheet electrode, or to compression molding to form a pellet electrode.

<Negative Electrode>

The negative electrode is appropriately selected depending on the intended purpose without any limitation, provided that the negative electrode contains a negative electrode active material. Examples of the negative electrode include a negative electrode, which contains a negative electrode material layer containing a negative electrode active material, provided on a negative electrode collector.

A shape of the negative electrode is appropriately selected depending on the intended purpose without any limitation, and examples thereof include a plate shape.

<<Negative Electrode Material Layer>>

The negative electrode material layer contains at least a negative electrode active material, and may further contain a binder, an electroconductive agent, etc. according to necessity.

—Negative Electrode Active Material—

The negative electrode active material is appropriately selected depending on the intended purpose without any limitation, provided that it is a material capable of reversibly accumulating and releasing cations. Examples of the negative electrode active material include: alkali metal ion; alkali earth metal; metal oxide capable of adsorbing and releasing alkali metal ion or alkali earth metal; metal capable of forming an alloy with alkali metal ion or alkali earth metal; an alloy containing the metal; a composite alloy compound containing the metal; and a non-reactive electrode due to physical adsorption of ions, such as a carbonaceous material having a large specific surface area. Among them, preferred is a material capable of reversibly accumulating and releasing lithium, or lithium ions, or both thereof, in view of the energy density, and more preferred is a non-reactive electrode in view of recycling capability.

Specific examples of the negative electrode active material include: a carbonaceous material; metal oxide capable of adsorbing and releasing lithium, such as antimony-doped tin oxide, and silicon monoxide; metal or alloy capable of forming an alloy with lithium, such as aluminum, tin, silicon, and zinc; a composite alloy compound composed of metal capable of forming an alloy with lithium, an alloy containing the metal, and lithium; and lithium metal nitride, such as lithium cobalt nitride. These may be used alone, or in combination. Among them, the carbonaceous material is particularly preferable in view of safety and cost.

Examples of the carbonaceous material include: blacklead (graphite), such as coke, artificial graphite, and natural graphite; and a thermal decomposition product of an organic material under various thermal decomposition conditions. Among them, artificial graphite, and natural graphite are particularly preferable.

—Binder—

The binder is appropriately selected depending on the intended purpose without any limitation, and examples thereof include: a fluorine-based binder, such as polyvinylidene fluoride (PVDF), and polytetrafluoroethylene (PTFE); ethylene-propylene-butadiene rubber (EPBR); styrene-butadiene rubber (SBR); isoprene rubber; and carboxymethyl cellulose (CMC). These may be used alone, or in combination. Among them, the fluorine-based binder, such as polyvinylidene fluoride (PVDF) and polytetrafluoroethylene (PTFE), and carboxymethyl cellulose (CMC) are preferable, and CMC is particularly preferable, as CMC contributes to improvement in the number of repeated charging-discharging compared to other binders.

—Electroconductive Agent—

Examples of the electroconductive agent include: a metal material, such as copper, and aluminum; and a carbonaceous material, such as carbon black, and acetylene black. These may be used alone, or in combination.

The average thickness of the negative electrode material layer is appropriately selected depending on the intended purpose without any limitation, but the average thickness thereof is preferably 10 µm to 450 µm, more preferably 20 µm to 100 µm. When the average thickness of the negative electrode material layer is less than 10 µm, charging-discharging cycle properties may be degraded. When the average thickness thereof is greater than 450 µm, an energy density may be reduced.

<<Negative Electrode Collector>>

A material, shape, size and structure of the negative electrode collector are appropriately selected depending on the intended purpose without any limitation.

The material of the negative electrode collector is appropriately selected depending on the intended purpose without any limitation, provided that the material thereof is composed of an electroconductive material. Examples thereof include stainless steel, nickel, aluminum, and copper. Among them, stainless steel, and copper are particularly preferable.

The shape of the negative electrode collector is appropriately selected depending on the intended purpose without any limitation.

The size of the negative electrode collector is appropriately selected depending on the intended purpose without any limitation, provided that it can be a size usable for the nonaqueous electrolytic storage element.

—Preparation Method of Negative Electrode—

The negative electrode can be produced by applying a negative electrode material, which has been formed into slurry by appropriately adding the binder, the electroconductive agent, and a solvent to the negative electrode active material, onto the negative electrode collector, followed by drying. As for the solvent, the aforementioned solvents usable in the preparation method of the positive electrode can be used.

Moreover, a composition, in which the binder, the electroconductive agent, etc. are added to the negative electrode active material, may be subjected to roll molding as it is to form a sheet electrode or to compression molding to form a pellet electrode. Alternatively, a thin layer of the negative electrode active material may be formed on the negative electrode collector by a method, such as vapor deposition, sputtering, and plating.

<Nonaqueous Electrolyte>

The nonaqueous electrolyte is an electrolytic solution containing a nonaqueous solvent, an electrolyte salt.

<<Nonaqueous Solvent>>

The nonaqueous solvent is appropriately selected depending on the intended purpose without any limitation, but it is preferably an aprotic organic solvent.

As for the aprotic organic solvent, there is a carbonate-based organic solvent, such as chain carbonate, and cyclic carbonate, and it is preferably a solvent having a low viscosity. Among them, the chain carbonate is preferable, as it has high solubility of the electrolyte salt.

Examples of the chain carbonate include dimethyl carbonate (DMC), diethylcarbonate (DEC), methylethylcarbonate (EMC), and methylpropionate (MP). Among them, dimethyl carbonate (DMC) is preferable.

An amount of DMC is appropriately selected depending on the intended purpose without any limitation, but it is preferably 70% by mass or greater, more preferably 90% by mass or greater, relative to the nonaqueous solvent. When the amount of the DMC is less than 70% by mass and the rest of the solvent is a cyclic compound (e.g., cyclic carbonate, and cyclic ester) having a high dielectric constant, a viscosity of a nonaqueous electrolyte, which is prepared to have a high concentration, such as 3 mol/L or higher, becomes excessively high, as an amount of the cyclic compound having a high dielectric constant is large. As a result, the nonaqueous electrolyte may be penetrated into an electrode, or a problem in diffusion of ions may occur.

Examples of the cyclic carbonate include propylenecarbonate (PC), ethylenecarbonate (EC), butylene carbonate (BC), and vinylene carbonate (VC).

In the case where a mixed solvent prepared by combining ethylenecarbonate (EC) as the cyclic carbonate, with dimethyl carbonate (DMC) as the chain carbonate is used, a mixing ratio of ethylenecarbonate (EC) to dimethyl carbonate (DMC) is appropriately selected depending on the intended purpose without any limitation. The mass ratio (EC:DMC) is preferably 3:10 to 1:99, more preferably 3:10 to 1:20.

Note that, as for the nonaqueous solvent, an ester-based organic solvent, such as cyclic ester, and chain ester, and an ether-based organic solvent, such as cyclic ether, and chain ether, can be optionally used.

Examples of the cyclic ester include γ-butyrolactone (γBL), 2-methyl-γ-butyrolactone, acetyl-γ-butyrolactone, and γ-valerolactone.

Examples of the chain ester include alkyl propionate, dialkyl malonate, alkyl acetate (e.g., methyl acetate (MA), and ethyl acetate), and alkyl formate (e.g., methyl formate (MF), and ethyl formate).

Examples of the cyclic ether include tetrahydrofuran, alkyl tetrahydrofuran, alkoxy tetrahydrofuran, dialkoxy tetrahydrofuran, 1,3-dioxolan, alkyl-1,3-dioxolan, and 1,4-dioxolan.

Examples of the chain ether include 1,2-dimethoxyethane (DME), diethyl ether, ethylene glycol dialkyl ether, diethylene glycol dialkyl ether, triethylene glycol dialkyl ether, and tetraethylene glycol dialkyl ether.

<<Electrolyte Salt>>

The electrolyte salt is not particularly limited, provided that it contains a halogen atom, is dissolved in a nonaqueous solvent, and exhibits high ion conductivity. As for the electrolyte salt, a combination of the following cation and the following anion can be used.

Examples of the cation include alkali metal ion, alkali earth metal ion, tetraalkyl ammonium ion, and Spiro quaternary ammonium ion.

Examples of the anion include $Cl^-$, $Br^-$, $I^-$, $ClO_4^-$, $BF_4^-$, $PF_6^-$, $SbF_6^-$, $CF_3SO_3^-$, $(CF_3SO_2)_2N^-$, and $(C_2F_5SO_2)_2N^-$.

Among the electrolyte salts containing a halogen atom, a lithium salt is particularly preferable, as use thereof improves a battery capacity.

The lithium salt is appropriately selected depending on the intended purpose without any limitation, and examples thereof include lithium hexafluorophosphate ($LiPF_6$), lithium perchlorate ($LiClO_4$), lithium chloride ($LiCl$), lithium fluoroborate ($LiBF_4$), lithium hexafluoroarsenate ($LiAsF_6$), lithium trifluorosulfonate ($LiCF_3SO_3$), lithium bistrifluoromethylsulfonyl imide ($LiN(C_2F_5SO_2)_2$), and lithium bisperfluoroethylsulfonyl imide ($LiN(CF_2F_5SO_2)_2$). These may be used alone, or in combination. Among them, $LiPF_6$ is particularly preferable in view of the size of the storage capacity of anions in the carbon electrode.

An amount of the electrolyte salt is appropriately selected depending on the intended purpose without any limitation, but it is preferably 3 mol/L or greater in the nonaqueous solvent, more preferably 3 mol/L to 6 mol/L, and even more preferably 3 mol/L to 4 mol/L for achieving both a desirable battery capacity and desirable output.

<Separator>

The separator is provided between a positive electrode and a negative electrode for the purpose of preventing a short circuit between the positive electrode and the negative electrode.

A material, shape, size, and structure of the separator are appropriately selected depending on the intended purpose without any limitation.

Examples of the material of the separator include: paper, such as kraft paper, vinylon blended paper, and synthetic pulp blended paper; polyolefin nonwoven fabric, such as cellophane, a polyethylene graft membrane, and polypropylene melt-flow nonwoven fabric; polyamide nonwoven fabric; and glass fiber nonwoven fabric.

Among them, a material having a porosity of 50% or greater is preferable in view of holding a nonaqueous electrolyte.

As for the shape of the separator, a nonwoven type thereof is more preferable than a thin film type thereof having micropores, in view of its high porosity.

The average thickness of the separator is appropriately selected depending on the intended purpose without any limitation, but the average thickness thereof is preferably 20 to 100 μm. When the average thickness of the separator is less than 20 μm, an amount of the electrolyte held may be small. When the average thickness thereof is greater than 100 μm, an energy density of a resulting element may be reduced.

As for a more preferable embodiment of the separator, it is preferred that a micropore film having a thickness of 30 μm or less be provided at the side of the negative electrode in order to prevent the positive-negative short circuit caused by precipitations of alkali metal or alkali earth metal at the side of the negative electrode, and a nonwoven cloth having a thickness of 20 μm to 100 μm and a porosity of 50% or greater be provided at the side of the positive electrode.

Examples of the shape of the separator include a sheet shape.

The size of the separator is appropriately selected depending on the intended purpose without any limitation, provided that it is the size usable for a nonaqueous electrolytic storage element.

The structure of the separator may be a single layer structure, or a multilayer structure.

<Other Members>

Other members are appropriately selected depending on the intended purpose without any limitation, and examples thereof include an outer tin, and an electrode lead wire.

<Production Method of Nonaqueous Electrolytic Storage Element>

The nonaqueous electrolytic storage element of the present invention can be produced by assembling the positive electrode, the negative electrode, the nonaqueous electrolyte, and the optional separator into an appropriate shape. Moreover, other members, such as an outer tin, can be used according to the necessity. A method for assembling the nonaqueous electrolytic storage element is appropriately selected from generally employed methods without any limitation.

The nonaqueous electrolytic storage element of the present invention is appropriately selected depending on the intended purpose without any limitation, but the maximum voltage during the charging and discharging thereof is preferably 4.3 V to 6.0 V. When the maximum voltage during the charging and discharging is lower than 4.3 V, anions cannot be sufficiently accumulated, which may reduce the capacity of the element. When the maximum voltage is higher than 6.0 V, decomposition of the solvent or electrolyte salt tends to be caused, which accelerate deterioration of the element.

FIG. 1 is a schematic diagram illustrating one example of the nonaqueous electrolytic storage element of the present invention. The nonaqueous electrolytic storage element 10 contains, in an outer tin 4 thereof, a positive electrode 1 containing a positive electrode active material capable of reversibly accumulating and releasing anions, a negative electrode 2 containing a negative electrode active material capable of reversibly accumulating and releasing cations, and a separator 3 provided the positive electrode 1 and the negative electrode 2. These positive electrode 1, negative electrode 2, and separator 3 are immersed in a nonaqueous electrolyte (not illustrated) prepared by dissolving an electrolyte salt in a nonaqueous solvent. Note that, "5" denotes a negative electrode lead wire, and "6" denotes a positive electrode lead wire.

—Shape—

A shape of the nonaqueous electrolytic storage element of the present invention is not particularly limited, and it may be appropriately selected from various shapes typically employed depending on use thereof. Examples thereof include a laminate electrode, a cylinder electrode where a sheet electrode and a separator are spirally provided, a cylinder element having an inside-out structure, in which a pellet electrode and a separator are used in combination, and a coin element, in which a pellet electrode and a separator are laminated.

<Use>

Use of the nonaqueous electrolytic storage element of the present invention is not particularly limited, and it may be used for various applications. Examples thereof include a laptop computer, a stylus-operated computer, a mobile computer, an electronic book player, a mobile phone, a mobile fax, a mobile printer, a headphone stereo, a video movie, a liquid crystal television, a handy cleaner, a portable CD, a minidisk, a transceiver, an electronic organizer, a calculator, a memory card, a mobile tape recorder, a radio, a back-up power supply, a motor, a lighting equipment, a toy, a game equipment, a clock, a strobe, and a camera.

EXAMPLES

Examples of the present invention are explained hereinafter, but Examples shall not be construed to limit the scope of the present invention.

<Measurements of Porosity and Pore Volume of Positive Electrode Material Layer and Negative Electrode Material Layer>

Porosities of the positive electrode material layer and the negative electrode material layer were calculated by measuring a gas absorption amount (pore volume) inside an electrode by means of Pycnometer 1200e manufactured by Malvern Instruments Ltd., and dividing the gas absorption amount (pore volume) by a geometric volume of the electrode.

<Average Thickness of Positive Electrode Material Layer and Negative Electrode Material Layer>

The average thickness of each of the positive electrode material layer and the negative electrode material layer was determined in the following manner. A thickness of an electrode was measured by a micrometer (G2-205, manufactured by OZAKI MFG. CO., LTD.), subtracting a thickness of a collector from the measured thickness of the electrode, to determined thicknesses of a positive electrode material layer and a negative electrode material layer. An average value of the thickness values measured in a several spots was determined as the average thickness.

Production Example 1 of Positive Electrode

—Production of Positive Electrode A—

As for a positive electrode active material, carbon powder (KS-6, manufactured by TIMCAL LTD.) was used. The carbon powder had a BET specific surface area of 20 $m^2/g$ as measured by nitrogen absorption, and had the average particle diameter (median diameter) of 3.4 μm, as measured by a laser diffraction particle size analyzer (SALD-2200, manufactured by Shimadzu Corporation).

To 2.7 g of the carbon powder (KS-6, manufactured by TIMCAL Ltd.) and 0.2 g of an electroconductive agent (acetylene black), water was added, and the resulting mixture was kneaded. To the resultant, 5 g of a 2% by mass carboxy methyl cellulose (CMC) aqueous solution was further added as a thickener, and the resulting mixture was kneaded to produce a positive electrode material layer composition (slurry). The positive electrode material layer composition was applied onto an aluminum foil, followed by vacuum drying for 4 hours at 120° C., to thereby form a positive electrode material layer. A circle having a diameter of 16 mm was stamped out of the positive electrode, to thereby produce Positive Electrode A. A mass of the carbon powder (graphite) in the positive electrode material layer coated on the aluminum (Al) foil having a diameter of 16 mm was 10 mg, the average thickness of the positive electrode material layer was 74 μm (0.0074 cm), a porosity of the positive electrode material layer was 0.65, and a pore volume of the positive electrode material layer per unit area was 4.81 $mm^3$.

Production Example 2 of Positive Electrode

—Production of Positive Electrode B—

Positive Electrode A as produced was compressed by means of a press (manufactured by TESTER SANGYO CO., LTD.) so that the average thickness of the positive electrode material layer was to be 52 μm (0.0052 cm), to thereby produce Positive Electrode B. A porosity of the positive electrode material layer was 0.50, and a pore volume of the positive electrode material layer per unit area was 2.59 $mm^3$.

Production Example 3 of Positive Electrode

—Production of Positive Electrode C—

Positive Electrode A as produced was compressed by means of a press (manufactured by TESTER SANGYO CO., LTD.) so that the average thickness of the positive electrode material layer was to be 43 μm (0.0043 cm), to thereby produce Positive Electrode C. A porosity of the positive electrode material layer was 0.40, and a pore volume of the positive electrode material layer per unit area was 1.73 $mm^3$.

Production Example 4 of Positive Electrode

—Production of Positive Electrode D—

Positive Electrode A as produced was compressed by means of a press (manufactured by TESTER SANGYO CO., LTD.) so that the average thickness of the positive electrode material layer was to be 41 μm (0.0041 cm), to thereby produce Positive Electrode D. A porosity of the positive electrode material layer was 0.37, and a pore volume of the positive electrode material layer per unit area was 1.52 $mm^3$.

Production Example 1 of Negative Electrode

—Production of Negative Electrode A—

As for a negative electrode active material, carbon powder (MAGD, manufactured by Hitachi Chemical Co., Ltd.) was used. The carbon powder had a BET specific surface area by nitrogen adsorption of 4.5 $m^2/g$, the average particle diameter (median diameter) of 20 μm as measured by a laser diffraction particle size analyzer (SALD-2200, manufactured by Shimadzu Corporation), and a tap density of 630 $kg/m^3$.

To 3 g of the carbon powder (graphite) and 0.15 g of an electroconductive agent (acetylene black), water was added, and the resulting mixture was kneaded. To the resultant, 4 g of a 3% by mass carboxy methyl cellulose (CMC) aqueous solution was further added as a thickener, and the resulting mixture was kneaded to thereby produce a negative electrode material layer composition (slurry). The negative electrode material layer composition was applied onto a Cu foil, followed by vacuum drying for 4 hours at 120° C., to thereby form a negative electrode material layer. A circle having a diameter of 16 mm was stamped out of the negative electrode, to thereby prepare Negative Electrode A. A mass of the carbon powder (graphite) in the negative electrode material layer coated on the Cu foil having the diameter of 16 mm was 5 mg, the average thickness of the negative electrode material layer was 44 μm (0.0044 cm), a porosity of the negative electrode material layer was 0.65, and a pore volume of the negative electrode material layer per unit area was 2.84 $mm^3/cm^2$.

Production Example 2 of Negative Electrode

—Production of Negative Electrode B—

Negative Electrode B was produced in the same manner as the negative electrode of Production Example 1, provided that the average thickness of the negative electrode material layer was changed to 59 μm (0.0059 cm), and the mass of the carbon powder (graphite) in the negative electrode material layer was changed to 7.5 mg. A porosity of the negative electrode material layer of Negative Electrode B was 0.65, and a pore volume of the negative electrode material layer per unit area was 2.70 mm$^3$/cm$^2$.

Production Example 3 of Negative Electrode

—Production of Negative Electrode C—

Negative Electrode C was produced in the same manner as the negative electrode of Production Example 1, provided that the average thickness of the negative electrode material layer was changed to 79 μm (0.0079 cm), and the mass of the carbon powder (graphite) in the negative electrode material layer was changed to 10 mg. A porosity of the negative electrode material layer of Negative Electrode C was 0.65, and a pore volume of the negative electrode material layer per unit area was 5.14 mm$^3$/cm$^2$.

Production Example 4 of Negative Electrode

—Production of Negative Electrode D—

Negative Electrode D was produced in the same manner as the negative electrode of Production Example 1, provided that the average thickness of the negative electrode material layer was changed to 119 μm (0.0119 cm), and the mass of the carbon powder (graphite) in the negative electrode material layer was changed to 15 mg. A porosity of the negative electrode material layer of Negative Electrode D was 0.65, and a pore volume of the negative electrode material layer per unit area was 7.70 mm$^3$/cm$^2$.

Production Example 5 of Negative Electrode

—Production of Negative Electrode E—

Negative Electrode E was produced in the same manner as the negative electrode of Production Example 1, provided that the average thickness of the negative electrode material layer was changed to 197 μm (0.0197 cm), and the mass of the carbon powder (graphite) in the negative electrode material layer was changed to 25 mg. A porosity of the negative electrode material layer of Negative Electrode E was 0.65, and a pore volume of the negative electrode material layer pre unit area was 12.84 mm$^3$/cm$^2$.

Production Example 6 of Negative Electrode

—Production of Negative Electrode F—

Negative electrode A as produced was compressed by means of a press (manufactured by TESTER SANGYO CO., LTD.) so that the average thickness of the negative electrode material layer was to be 28 μm (0.0028 cm), to thereby produce Negative Electrode F. A porosity of the negative electrode material layer was 0.50, and a pore volume of the negative electrode material layer per unit area was 1.38 mm$^3$/cm$^2$.

Production Example 7 of Negative Electrode

—Production of Negative Electrode G—

Negative electrode A as produced was compressed by means of a press (manufactured by TESTER SANGYO CO., LTD.) so that the average thickness of the negative electrode material layer was to be 55 μm (0.0055 cm), to thereby produce Negative Electrode G. A porosity of the negative electrode material layer was 0.50, and a pore volume of the negative electrode material layer per unit area was 2.77 mm$^3$/cm$^2$.

Production Example 8 of Negative Electrode

—Production of Negative Electrode H—

Negative electrode A as produced was compressed by means of a press (manufactured by TESTER SANGYO CO., LTD.) so that the average thickness of the negative electrode material layer was to be 83 μm (0.0083 cm), to thereby produce Negative Electrode H. A porosity of the negative electrode material layer was 0.50, and a pore volume of the negative electrode material layer per unit area was 4.15 mm$^3$/cm$^2$.

Production Example 9 of Negative Electrode

—Production of Negative Electrode I—

Negative electrode A as produced was compressed by means of a press (manufactured by TESTER SANGYO CO., LTD.) so that the average thickness of the negative electrode material layer was to be 138 μm (0.0138 cm), to thereby produce Negative Electrode I. A porosity of the negative electrode material layer was 0.50, and a pore volume of the negative electrode material layer was 6.91 mm$^3$/cm$^2$.

Production Example 10 of Negative Electrode

—Production of Negative Electrode J—

Negative electrode A as produced was compressed by means of a press (manufactured by TESTER SANGYO CO., LTD.) so that the average thickness of the negative electrode material layer was to be 23 μm (0.0023 cm), to thereby produce Negative Electrode J. A porosity of the negative electrode material layer was 0.40, and a pore volume of the negative electrode material layer per unit area was 0.92 mm$^3$/cm$^2$.

Production Example 11 of Negative Electrode

—Production of Negative Electrode K—

Negative electrode B as produced was compressed by means of a press (manufactured by TESTER SANGYO CO., LTD.) so that the average thickness of the negative electrode material layer was to be 35 μm (0.0035 cm), to thereby produce Negative Electrode K. A porosity of the negative electrode material layer was 0.40, and a pore volume of the negative electrode material layer per unit area was 1.38 mm$^3$/cm$^2$.

Production Example 12 of Negative Electrode

—Production of Negative Electrode L—

Negative electrode C as produced was compressed by means of a press (manufactured by TESTER SANGYO CO., LTD.) so that the average thickness of the negative electrode material layer was to be 46 μm (0.0046 cm), to thereby produce Negative Electrode L. A porosity of the negative electrode material layer was 0.40, and a pore volume of the negative electrode material layer per unit area was 1.84 mm$^3$/cm$^2$.

Production Example 13 of Negative Electrode

—Production of Negative Electrode M—

Negative electrode D as produced was compressed by means of a press (manufactured by TESTER SANGYO CO., LTD.) so that the average thickness of the negative electrode material layer was to be 69 μm (0.0069 cm), to thereby produce Negative Electrode M. A porosity of the negative electrode material layer was 0.40, and a pore volume of the negative electrode material layer per unit area was 2.77 mm$^3$/cm$^2$.

Production Example 14 of Negative Electrode

—Production of Negative Electrode N—

Negative electrode E as produced was compressed by means of a press (manufactured by TESTER SANGYO CO., LTD.) so that the average thickness of the negative electrode material layer was to be 115 μm (0.0115 cm), to thereby produce Negative Electrode N. A porosity of the negative electrode material layer was 0.40, and a pore volume of the negative electrode material layer per unit area was 4.61 mm$^3$/cm$^2$.

Production Example 15 of Negative Electrode

—Production of Negative Electrode O—

Negative electrode D as produced was compressed by means of a press (manufactured by TESTER SANGYO CO., LTD.) so that the average thickness of the negative electrode material layer was to be 66 μm (0.0066 cm), to thereby produce Negative Electrode O. A porosity of the negative electrode material layer was 0.37, and a pore volume of the negative electrode material layer per unit area was 2.44 mm$^3$/cm$^2$.

Production Example 1 of Nonaqueous Electrolyte

—Production of Nonaqueous Electrolyte A—

As for Nonaqueous Electrolyte A, 0.3 mL of dimethyl carbonate (DMC), in which 1.7 mol/L of LiPF$_6$ had been dissolved, was prepared.

Production Example 2 of Nonaqueous Electrolyte

—Production of Nonaqueous Electrolyte B—

As for Nonaqueous Electrolyte B, 0.3 mL of dimethyl carbonate (DMC), in which 3.2 mol/L of LiPF$_6$ had been dissolved, was prepared.

Production Example 3 of Nonaqueous Electrolyte

—Production of Nonaqueous Electrolyte C—

As for Nonaqueous Electrolyte C, 0.3 mL of dimethyl carbonate (DMC), in which 4.0 mol/L of LiPF$_6$ had been dissolved, was prepared.

<Separator>

As for a separator, a separator (manufactured by JMT INC.), which was formed of polypropylene, and had a thickness of 20 μm and a porosity of 60%, was prepared.

<Production of Nonaqueous Electrolytic Storage Element>

The positive electrode, the separator, the negative electrode, and the nonaqueous electrolyte were placed in a tin for producing a coin storage element (2032 type, manufactured by Hohsen Corp.), and the tin was crimped with a crimping device (manufactured by Hohsen Corp.), to thereby produce a nonaqueous electrolytic storage element.

<Confirmation of Capacity of Positive Electrode A>

Positive Electrode A, the separator, Nonaqueous Electrolyte A, and lithium (manufactured by Honjo Metal Co., Ltd., thickness: 200 μm) were placed in a coin tin to compose a storage element. This storage element was charged until the charge termination voltage of 5.2 V with constant electric current of 0.5 mA/cm$^2$ at room temperature (25° C.). After the first charging, an initial charging and discharging of the storage element was performed by discharging to 2.5 V with constant electric current of 0.5 mA/cm$^2$. The storage element after the initial charging and discharging was charged to 5.2 V with constant electric current of 0.5 mA/cm$^2$, followed by discharging the storage element to 2.5 V with constant electric current of 0.5 mA/cm$^2$. The aforementioned charging and discharging process was determined as 1 cycle of charging and discharging. This charging-discharging cycle was performed twice, and a capacity of Positive Electrode A per unit area was measured. The capacity thereof as measured was 0.45 mAh/cm$^2$. Note that, the capacity of Positive Electrode A was measured by means of a charge/discharge measurement device (TOSCAT3001, manufactured by TOYO SYSTEM CO., LTD.).

<Confirmation of Capacity of Positive Electrode B>

A capacity of Positive Electrode B per unit area was confirmed in the same manner as the confirmation of the capacity of Positive Electrode A. The capacity of Positive Electrode B was 0.45 mAh/cm$^2$.

<Confirmation of Capacity of Positive Electrode C>

A capacity of Positive Electrode C per unit area was confirmed in the same manner as the confirmation of the capacity of Positive Electrode A. The capacity of Positive Electrode C was 0.45 mAh/cm$^2$.

<Confirmation of Capacity of Positive Electrode D>

A capacity of Positive Electrode D per unit area was confirmed in the same manner as the confirmation of the capacity of Positive Electrode A. The capacity of Positive Electrode D was 0.44 mAh/cm$^2$.

<Confirmation of Capacity of Negative Electrode A>

Negative Electrode A, the separator, Nonaqueous Electrolyte A, and lithium (manufactured by Honjo Metal Co., Ltd., thickness: 200 μm) were placed in a coin tin to compose a storage element. This storage element was charged until the charge termination voltage of 0 V with constant electric current of 0.5 mA/cm$^2$ at room temperature (25° C.). After the first charging, an initial charging and discharging of the storage element was performed by discharging to 2.5 V with constant electric current of 0.5 mA/cm$^2$. The storage element after the initial charging and discharging was charged to 0 V with constant electric current of 0.5 mA/cm$^2$, followed by discharging the storage element to 2.5 V with constant electric current of 0.5 mA/cm$^2$. The aforementioned charging and discharging process was determined as 1 cycle of charging and discharging. This charging-discharging cycle was performed twice, and a capacity of Negative Electrode A per unit area was measured. The capacity thereof as measured was 0.91 mAh/cm$^2$. Note that, the capacity of Negative Electrode A was measured by means of a charge/discharge measurement device (TOSCAT3001, manufactured by TOYO SYSTEM CO., LTD.).

<Confirmation of Capacity of Negative Electrode B>

A capacity of Negative Electrode B per unit area was confirmed in the same manner as the confirmation of the capacity of Negative Electrode A. The capacity of Negative Electrode B was 1.35 mAh/cm$^2$.

<Confirmation of Capacity of Negative Electrode C>

A capacity of Negative Electrode C per unit area was confirmed in the same manner as the confirmation of the capacity of Negative Electrode A. The capacity of Negative Electrode C was 1.79 mAh/cm$^2$.

<Confirmation of Capacity of Negative Electrode D>

A capacity of Negative Electrode D per unit area was confirmed in the same manner as the confirmation of the capacity of Negative Electrode A. The capacity of Negative Electrode D was 2.68 mAh/cm$^2$.

<Confirmation of Capacity of Negative Electrode E>

A capacity of Negative Electrode E per unit area was confirmed in the same manner as the confirmation of the capacity of Negative Electrode A. The capacity of Negative Electrode E was 4.47 mAh/cm$^2$.

<Confirmation of Capacity of Negative Electrode F>

A capacity of Negative Electrode F per unit area was confirmed in the same manner as the confirmation of the capacity of Negative Electrode A. The capacity of Negative Electrode F was 0.90 mAh/cm$^2$.

<Confirmation of Capacity of Negative Electrode G>

A capacity of Negative Electrode G per unit area was confirmed in the same manner as the confirmation of the capacity of Negative Electrode A. The capacity of Negative Electrode G was 1.79 mAh/cm$^2$.

<Confirmation of Capacity of Negative Electrode H>

A capacity of Negative Electrode H per unit area was confirmed in the same manner as the confirmation of the capacity of Negative Electrode A. The capacity of Negative Electrode H was 2.69 mAh/cm$^2$.

<Confirmation of Capacity of Negative Electrode I>

A capacity of Negative Electrode I per unit area was confirmed in the same manner as the confirmation of the capacity of Negative Electrode A. The capacity of Negative Electrode I was 4.53 mAh/cm$^2$.

<Confirmation of Capacity of Negative Electrode J>

A capacity of Negative Electrode J per unit area was confirmed in the same manner as the confirmation of the capacity of Negative Electrode A. The capacity of Negative Electrode J was 0.89 mAh/cm$^2$.

<Confirmation of Capacity of Negative Electrode K>

A capacity of Negative Electrode K per unit area was confirmed in the same manner as the confirmation of the capacity of Negative Electrode A. The capacity of Negative Electrode K was 1.33 mAh/cm$^2$.

<Confirmation of Capacity of Negative Electrode L>

A capacity of Negative Electrode L per unit area was confirmed in the same manner as the confirmation of the capacity of Negative Electrode A. The capacity of Negative Electrode L was 1.78 mAh/cm$^2$.

<Confirmation of Capacity of Negative Electrode M>

A capacity of Negative Electrode M per unit area was confirmed in the same manner as the confirmation of the capacity of Negative Electrode A. The capacity of Negative Electrode M was 2.67 mAh/cm$^2$.

<Confirmation of Capacity of Negative Electrode N>

A capacity of Negative Electrode N per unit area was confirmed in the same manner as the confirmation of the capacity of Negative Electrode A. The capacity of Negative Electrode N was 4.45 mAh/cm$^2$.

<Confirmation of Capacity of Negative Electrode O>

A capacity of Negative Electrode O per unit area was confirmed in the same manner as the confirmation of the capacity of Negative Electrode A. The capacity of Negative Electrode O was 2.66 mAh/cm$^2$.

Example 1

Positive Electrode A, the separator, Nonaqueous Electrolyte A, and Negative Electrode C were placed in a coin tin to assemble a nonaqueous electrolytic storage element of Example 1.

The obtained nonaqueous electrolytic storage element was charged up to the charge termination voltage of 5.2 V with constant electric current of 0.5 mA/cm$^2$ at room temperature (25° C.). After the first charging, the nonaqueous electrolytic storage element was discharged to 2.5 V with constant electric current of 0.5 mA/cm$^2$, to thereby perform initial charging and discharging. The storage element after the initial charging and discharging was charged to 5.2 V with constant electric current of 0.5 mA/cm$^2$, followed by discharging the storage element to 2.5 V with constant electric current of 0.5 mA/cm$^2$. The aforementioned charging and discharging process was determined as 1 cycle of charging and discharging. This charging-discharging cycle was performed up to 50 cycles.

A capacity ratio (a capacity of the negative electrode/a capacity of the positive electrode) thereof was 3.98, a pore volume ratio (a pore volume of the negative electrode/a pore volume of the positive electrode) was 1.07, and a pore volume ratio (a pore volume of the positive electrode/a pore volume of the separator) was 4.01.

A capacity maintaining rate of the nonaqueous electrolytic storage element after 50 cycles, which was measured in the below-described manner, was 90.0%. Moreover, a volume energy density of the power generating element with respect to the 2nd cycle, which was measured in the below-described manner, was 25.3 mAh/cm$^3$. The results are presented in Table 2. Note that, the measurement was performed by means of a charge/discharge measurement device (TOSCAT3001, manufactured by TOYO SYSTEM CO., LTD.).

[Capacity Maintaining Rate after 50 Cycles]

The capacity maintaining rate after 50 cycles was calculated using the discharge capacity at the 2nd cycle as a standard (100%), and was evaluated based on the following criteria.

—Evaluation Criteria—

A: The capacity maintaining rate after 50 cycle was 70% or higher.

B: The capacity maintaining rate after 50 cycle was lower than 70%.

[Volume Energy Density of Power Generating Element with Respect to Capacity of 2nd Cycle]

The volume energy density of the power generating element with respect to the capacity of the 2nd cycle was calculated using the following formula:

Discharge capacity of electrode having a diameter of 16 mm/(sum of geometric volume of positive electrode material layer having a diameter of 16 mm and geometric volume of negative electrode material layer having a diameter of 16 mm)

Example 2

A nonaqueous electrolytic storage element of Example 2 was produced in the same manner as in Example 1, provided that 5 sheets of the separator (total thickness: 0.01 cm) was used.

The charging-discharging cycles were performed on the obtained nonaqueous electrolytic storage element in the same manner as in Example 1. A capacity ratio (a capacity of the negative electrode/a capacity of the positive electrode) was 3.98, a pore volume ratio (a pore volume of the negative electrode/a pore volume of the positive electrode) was 1.07, and a pore volume ratio (a pore volume of the positive electrode/a pore volume of the separator) was 0.80.

A capacity maintaining rate of the nonaqueous electrolytic storage element after 50 cycles, which was measured in the same manner as in Example 1, was 96.6%, and a volume energy density of the power generating element with respect to the 2nd cycle, which was measured in the same manner as in Example 1, was 17.3 mAh/cm$^3$. The results are presented in Table 2.

Compared to Example 1, the volume energy density of the power generating element was largely reduced in Example 2, as the volume of the separator was increased.

Example 3

Negative Electrode D, the separator, dimethyl carbonate (DMC) in which 0.5 mol/L of LiPF$_6$ had been dissolved, and lithium (manufactured by Honjo Metal Co., Ltd., thickness: 200 μm) were placed in a 2-electrode cell manufactured by Hohsen Corp., to compose a half cell.

To the obtained half cell, electric current was applied up to the voltage of 0.1 V at the constant electric current rate of 0.5 mA/cm$^2$ at room temperature (25° C.). The cell was dismantled to take out the negative electrode doped with lithium ions.

Next, Positive Electrode A, the separator, Nonaqueous Electrolyte A, and the taken out negative electrode were placed in a coin tin, to assemble a nonaqueous electrolytic storage element of Example 3.

After the first charging, the obtained nonaqueous electrolytic storage element was discharged to 2.5 V with constant electric current of 0.5 mA/cm$^2$, to thereby perform initial charging and discharging. The storage element after the initial charging and discharging was charged to 5.2 V with constant electric current of 0.5 mA/cm$^2$, followed by discharging the storage element to 2.5 V with constant electric current of 0.5 mA/cm$^2$. The aforementioned charging and discharging process was determined as 1 cycle of charging and discharging. This charging-discharging cycle was performed up to 50 cycles.

A capacity ratio (a capacity of the negative electrode/a capacity of the positive electrode) thereof was 5.96, a pore volume ratio (a pore volume of the negative electrode/a pore volume of the positive electrode) was 1.60, and a pore volume ratio (a pore volume of the positive electrode/a pore volume of the separator) was 4.01.

A capacity maintaining rate of the nonaqueous electrolytic storage element after 50 cycles, which was measured in the same manner as in Example 1, was 90.0%, and a volume energy density of the power generating element with respect to the 2nd cycle, which was measured in the same manner as in Example 1, was 21.8 mAh/cm$^3$. Note that, the measurement was performed by means of a charge/discharge measurement device (TOSCAT3001, manufactured by TOYO SYSTEM CO., LTD.). The results are presented in Table 2.

Example 4

A nonaqueous electrolytic storage element of Example 4 was assembled in the same manner as in Example 3, provided that Negative Electrode D was replaced with Negative Electrode E.

The charging-discharging cycles were performed on the obtained nonaqueous electrolytic storage element in the same manner as in Example 3. A capacity ratio (a capacity of the negative electrode/a capacity of the positive electrode) was 9.93, a pore volume ratio (a pore volume of the negative electrode/a pore volume of the positive electrode) was 2.67, and a pore volume ratio (a pore volume of the positive electrode/a pore volume of the separator) was 4.01.

A capacity maintaining rate of the nonaqueous electrolytic storage element after 50 cycles, which was measured in the same manner as in Example 1, was 90.0%, and a volume energy density of the power generating element with respect to the 2nd cycle, which was measured in the same manner as in Example 1, was 16.2 mAh/cm$^3$. The results are presented in Table 2.

Comparative Example 1

A nonaqueous electrolytic storage element of Comparative Example 1 was assembled in the same manner as in Example 1, provided that Negative Electrode C was replaced with Negative Electrode A.

The charging-discharging cycles were performed on the obtained nonaqueous electrolytic storage element in the same manner as in Example 1. A capacity ratio (a capacity of the negative electrode/a capacity of the positive electrode) was 2.02, a pore volume ratio (a pore volume of the negative electrode/a pore volume of the positive electrode) was 0.59, and a pore volume ratio (a pore volume of the positive electrode/a pore volume of the separator) was 4.01.

A capacity maintaining rate of the nonaqueous electrolytic storage element after 50 cycles, which was measured in the same manner as in Example 1, was 55.0%, and a volume energy density of the power generating element with respect to the 2nd cycle, which was measured in the same manner as in Example 1, was 29.6 mAh/cm$^3$. The results are presented in Table 2.

Compared to Examples 1 to 4, reduction in the capacity was large in Comparative Example 1. It was assumed that the large reduction in the capacity was caused probably because the nonaqueous electrolyte could not sufficiently supplied due to the reduction in the pore volume ratio (the pore volume of the negative electrode/the pore volume of the positive electrode).

Comparative Example 2

A nonaqueous electrolytic storage element of Comparative Example 2 was assembled in the same manner as in Example 1, provided that Negative Electrode C was replaced with Negative Electrode B.

The charging-discharging cycles were performed on the obtained nonaqueous electrolytic storage element in the same manner as in Example 1. A capacity ratio (a capacity of the negative electrode/a capacity of the positive electrode) was 3.00, a pore volume ratio (a pore volume of the negative electrode/a pore volume of the positive electrode) was 0.80, and a pore volume ratio (a pore volume of the positive electrode/a pore volume of the separator) was 4.01.

A capacity maintaining rate of the nonaqueous electrolytic storage element after 50 cycles, which was measured in the same manner as in Example 1, was 65.0%, and a volume energy density of the power generating element with respect to the 2nd cycle, which was measured in the same manner as in Example 1, was 27.9 mAh/cm$^3$. The results are presented in Table 2.

Compared to Examples 1 to 4, reduction in the capacity was large in Comparative Example 2. It was assumed that the large reduction in the capacity was caused probably because the nonaqueous electrolyte could not sufficiently supplied due to the reduction in the pore volume ratio (the pore volume of the negative electrode/the pore volume of the positive electrode).

Example 5

A nonaqueous electrolytic storage element of Example 5 was assembled in the same manner as in Example 1, provided that Positive Electrode B, the separator, Nonaqueous Electrolyte B, and Negative Electrode A were placed in the coin tin.

The charging-discharging cycles were performed on the obtained nonaqueous electrolytic storage element in the same manner as in Example 1.

A capacity ratio (a capacity of the negative electrode/a capacity of the positive electrode) was 2.02, a pore volume ratio (a pore volume of the negative electrode/a pore volume of the positive electrode) was 1.10, and a pore volume ratio (a pore volume of the positive electrode/a pore volume of the separator) was 2.16.

A capacity maintaining rate of the nonaqueous electrolytic storage element after 50 cycles, which was measured in the same manner as in Example 1, was 71.3%, and a volume energy density of the power generating element with respect to the 2nd cycle, which was measured in the same manner as in Example 1, was 37.4 mAh/cm$^3$. The results are presented in Table 2.

Example 6

Negative Electrode B, the separator, dimethyl carbonate (DMC) in which 0.5 mol/L of LiPF$_6$ had been dissolved, and lithium (manufactured by Honjo Metal Co., Ltd., thickness: 200 µm) were placed in a 2-electrode cell manufactured by Hohsen Corp., to compose a half cell. To the obtained half cell, electric current was applied up to the voltage of 0.1 V at the constant electric current rate of 0.5 mA/cm$^2$ at room temperature (25° C.). The cell was dismantled to take out the negative electrode doped with lithium ions.

Next, Positive Electrode B, the separator, Nonaqueous Electrolyte B, and the taken out negative electrode were placed in a coin tin, to assemble a nonaqueous electrolytic storage element of Example 6.

After the first charging, the obtained nonaqueous electrolytic storage element was discharged to 2.5 V with constant electric current of 0.5 mA/cm$^2$, to thereby perform initial charging and discharging. The storage element after the initial charging and discharging was charged to 5.2 V with constant electric current of 0.5 mA/cm$^2$, followed by discharging the storage element to 2.5 V with constant electric current of 0.5 mA/cm$^2$. The aforementioned charging and discharging process was determined as 1 cycle of charging and discharging. This charging-discharging cycle was performed up to 50 cycles. A capacity ratio (a capacity of the negative electrode/a capacity of the positive electrode) thereof was 3.01, a pore volume ratio (a pore volume of the negative electrode/a pore volume of the positive electrode) was 1.04, and a pore volume ratio (a pore volume of the positive electrode/a pore volume of the separator) was 2.16.

A capacity maintaining rate of the nonaqueous electrolytic storage element after 50 cycles, which was measured in the same manner as in Example 1, was 87.8%, and a volume energy density of the power generating element with respect to the 2nd cycle, which was measured in the same manner as in Example 1, was 40.0 mAh/cm$^3$. Note that, the measurement was performed by means of a charge/discharge measurement device (TOSCAT3001, manufactured by TOYO SYSTEM CO., LTD.). The results are presented in Table 2.

Example 7

A nonaqueous electrolytic storage element of Example 7 was assembled in the same manner as in Example 6, provided that Negative Electrode B was replaced with Negative Electrode G.

The charging-discharging cycles were performed on the obtained nonaqueous electrolytic storage element in the same manner as in Example 6.

A capacity ratio (a capacity of the negative electrode/a capacity of the positive electrode) was 3.98, a pore volume ratio (a pore volume of the negative electrode/a pore volume of the positive electrode) was 1.07, and a pore volume ratio (a pore volume of the positive electrode/a pore volume of the separator) was 2.16.

A capacity maintaining rate of the nonaqueous electrolytic storage element after 50 cycles, which was measured in the same manner as in Example 1, was 87.0%, and a volume energy density of the power generating element with respect to the 2nd cycle, which was measured in the same manner as in Example 1, was 36.8 mAh/cm$^3$. The results are presented in Table 2.

Example 8

A nonaqueous electrolytic storage element of Example 8 was produced in the same manner as in Example 7, provided that 5 sheets of the separator (total thickness: 0.01 cm) was used.

The charging-discharging cycles were performed on the obtained nonaqueous electrolytic storage element in the same manner as in Example 6. A capacity ratio (a capacity of the negative electrode/a capacity of the positive electrode) was 3.98, a pore volume ratio (a pore volume of the negative electrode/a pore volume of the positive electrode) was 1.07, and a pore volume ratio (a pore volume of the positive electrode/a pore volume of the separator) was 0.43.

A capacity maintaining rate of the nonaqueous electrolytic storage element after 50 cycles, which was measured in the same manner as in Example 1, was 95.7%, and a volume energy density of the power generating element with respect to the 2nd cycle, which was measured in the same manner as in Example 1, was 22.6 mAh/cm$^3$. The results are presented in Table 2.

Compared to Example 7, the volume energy density of the power generating element was reduced in Example 8, as the volume of the separator was increased.

Example 9

A nonaqueous electrolytic storage element of Example 9 was assembled in the same manner as in Example 6, provided that Negative Electrode B was replaced with Negative Electrode H.

The charging-discharging cycles were performed on the obtained nonaqueous electrolytic storage element in the same manner as in Example 6. A capacity ratio (a capacity of the negative electrode/a capacity of the positive electrode) was 5.98, a pore volume ratio (a pore volume of the negative electrode/a pore volume of the positive electrode) was 1.60, and a pore volume ratio (a pore volume of the positive electrode/a pore volume of the separator) was 2.16.

A capacity maintaining rate of the nonaqueous electrolytic storage element after 50 cycles, which was measured in the same manner as in Example 1, was 85.9%, and a volume energy density of the power generating element with respect to the 2nd cycle, which was measured in the same manner as in Example 1, was 30.2 mAh/cm$^3$. The results are presented in Table 2.

Example 10

A nonaqueous electrolytic storage element of Example 10 was assembled in the same manner as in Example 6, provided that Negative Electrode B was replaced with Negative Electrode I.

The charging-discharging cycles were performed on the obtained nonaqueous electrolytic storage element in the same manner as in Example 6. A capacity ratio (a capacity of the negative electrode/a capacity of the positive electrode) was 10.07, a pore volume ratio (a pore volume of the negative electrode/a pore volume of the positive electrode) was 2.67, and a pore volume ratio (a pore volume of the positive electrode/a pore volume of the separator) was 2.16.

A capacity maintaining rate of the nonaqueous electrolytic storage element after 50 cycles, which was measured in the same manner as in Example 1, was 86.0%, and a volume energy density of the power generating element with respect to the 2nd cycle, which was measured in the same manner as in Example 1, was 22.5 mAh/cm$^3$. The results are presented in Table 2.

Comparative Example 3

A nonaqueous electrolytic storage element of Comparative Example 3 was assembled in the same manner as in Example 1, provided that Positive Electrode B, the separator, Nonaqueous Electrolyte B, and Negative Electrode F were placed in the coin tin.

The charging-discharging cycles were performed on the obtained nonaqueous electrolytic storage element in the same manner as in Example 1. A capacity ratio (a capacity of the negative electrode/a capacity of the positive electrode) was 2.00, a pore volume ratio (a pore volume of the negative electrode/a pore volume of the positive electrode) was 0.53, and a pore volume ratio (a pore volume of the positive electrode/a pore volume of the separator) was 2.16.

A capacity maintaining rate of the nonaqueous electrolytic storage element after 50 cycles, which was measured in the same manner as in Example 1, was 30.6%, and a volume energy density of the power generating element with respect to the 2nd cycle, which was measured in the same manner as in Example 1, was 47.5 mAh/cm$^3$. The results are presented in Table 2.

Compared to Examples 5 to 10, reduction in the capacity was large in Comparative Example 3. It was assumed that the large reduction in the capacity was caused probably because the nonaqueous electrolyte could not sufficiently supplied due to the reduction in the pore volume ratio (the pore volume of the negative electrode/the pore volume of the positive electrode).

Example 11

Negative Electrode A, the separator, dimethyl carbonate (DMC) in which 0.5 mol/L of LiPF$_6$ had been dissolved, and lithium (manufactured by Honjo Metal Co., Ltd., thickness: 200 μm) were placed in a 2-electrode cell manufactured by Hohsen Corp., to compose a half cell. To the obtained half cell, electric current was applied up to the voltage of 0.1 V at the constant electric current rate of 0.5 mA/cm$^2$ at room temperature (25° C.). The cell was dismantled to take out the negative electrode doped with lithium ions.

Next, Positive Electrode C, the separator, Nonaqueous Electrolyte C, and the taken out negative electrode were placed in a coin tin, to assemble a nonaqueous electrolytic storage element of Example 11.

After the first charging, the obtained nonaqueous electrolytic storage element was discharged to 2.5 V with constant electric current of 0.5 mA/cm$^2$, to thereby perform initial charging and discharging. The storage element after the initial charging and discharging was charged to 5.2 V with constant electric current of 0.5 mA/cm$^2$, followed by discharging the storage element to 2.5 V with constant electric current of 0.5 mA/cm$^2$. The aforementioned charging and discharging process was determined as 1 cycle of charging and discharging. This charging-discharging cycle was performed up to 50 cycles. A capacity ratio (a capacity of the negative electrode/a capacity of the positive electrode) thereof was 2.02, a pore volume ratio (a pore volume of the negative electrode/a pore volume of the positive electrode) was 1.64, and a pore volume ratio (a pore volume of the positive electrode/a pore volume of the separator) was 1.44.

A capacity maintaining rate of the nonaqueous electrolytic storage element after 50 cycles, which was measured in the same manner as in Example 1, was 71.1%, and a volume energy density of the power generating element with respect to the 2nd cycle, which was measured in the same manner as in Example 1, was 41.9 mAh/cm$^3$. Note that, the measurement was performed by means of a charge/discharge measurement device (TOSCAT3001, manufactured by TOYO SYSTEM CO., LTD.). The results are presented in Table 2.

Example 12

A nonaqueous electrolytic storage element of Example 12 was assembled in the same manner as in Example 11, provided that Negative Electrode A was replaced with Negative Electrode B.

The charging-discharging cycles were performed on the obtained nonaqueous electrolytic storage element in the same manner as in Example 11. A capacity ratio (a capacity of the negative electrode/a capacity of the positive electrode) was 3.01, a pore volume ratio (a pore volume of the negative electrode/a pore volume of the positive electrode) was 2.23, and a pore volume ratio (a pore volume of the positive electrode/a pore volume of the separator) was 1.44.

A capacity maintaining rate of the nonaqueous electrolytic storage element after 50 cycles, which was measured in the same manner as in Example 1, was 71.1%, and a volume energy density of the power generating element with respect to the 2nd cycle, which was measured in the same manner as in Example 1, was 36.6 mAh/cm$^3$. The results are presented in Table 2.

Example 13

A nonaqueous electrolytic storage element of Example 13 was assembled in the same manner as in Example 11, provided that Negative Electrode A was replaced with Negative Electrode L.

The charging-discharging cycles were performed on the obtained nonaqueous electrolytic storage element in the same manner as in Example 11. A capacity ratio (a capacity of the negative electrode/a capacity of the positive electrode) was 3.96, a pore volume ratio (a pore volume of the negative electrode/a pore volume of the positive electrode) was 1.07, and a pore volume ratio (a pore volume of the positive electrode/a pore volume of the separator) was 1.44.

A capacity maintaining rate of the nonaqueous electrolytic storage element after 50 cycles, which was measured in the same manner as in Example 1, was 75.0%, and a volume energy density of the power generating element with respect to the 2nd cycle, which was measured in the same manner as in Example 1, was 36.4 mAh/cm$^3$. The results are presented in Table 2.

Example 14

A nonaqueous electrolytic storage element of Example 14 was produced in the same manner as in Example 13, provided that 5 sheets of the separator (total thickness: 0.01 cm) was used.

The charging-discharging cycles were performed on the obtained nonaqueous electrolytic storage element in the same manner as in Example 11. A capacity ratio (a capacity of the negative electrode/a capacity of the positive electrode) was 3.96, a pore volume ratio (a pore volume of the negative electrode/a pore volume of the positive electrode) was 1.06, and a pore volume ratio (a pore volume of the positive electrode/a pore volume of the separator) was 0.29.

A capacity maintaining rate of the nonaqueous electrolytic storage element after 50 cycles, which was measured in the same manner as in Example 1, was 86.3%, and a volume energy density of the power generating element with respect to the 2nd cycle, which was measured in the same manner as in Example 1, was 21.0 mAh/cm$^3$. The results are presented in Table 2.

Compared to Example 13, the volume energy density of the power generating element was reduced in Example 14, as the volume of the separator was increased.

Example 15

A nonaqueous electrolytic storage element of Example 15 was assembled in the same manner as in Example 11, provided that Negative Electrode A was replaced with Negative Electrode M.

The charging-discharging cycles were performed on the obtained nonaqueous electrolytic storage element in the same manner as in Example 11. A capacity ratio (a capacity of the negative electrode/a capacity of the positive electrode) was 5.93, a pore volume ratio (a pore volume of the negative electrode/a pore volume of the positive electrode) was 1.60, and a pore volume ratio (a pore volume of the positive electrode/a pore volume of the separator) was 1.44.

A capacity maintaining rate of the nonaqueous electrolytic storage element after 50 cycles, which was measured in the same manner as in Example 1, was 80.0%, and a volume energy density of the power generating element with respect to the 2nd cycle, which was measured in the same manner as in Example 1, was 33.8 mAh/cm$^3$. The results are presented in Table 2.

Example 16

A nonaqueous electrolytic storage element of Example 16 was assembled in the same manner as in Example 11, provided that Negative Electrode A was replaced with Negative Electrode N.

The charging-discharging cycles were performed on the obtained nonaqueous electrolytic storage element in the same manner as in Example 11. A capacity ratio (a capacity of the negative electrode/a capacity of the positive electrode) was 9.89, a pore volume ratio (a pore volume of the negative electrode/a pore volume of the positive electrode) was 2.67, and a pore volume ratio (a pore volume of the positive electrode/a pore volume of the separator) was 1.44.

A capacity maintaining rate of the nonaqueous electrolytic storage element after 50 cycles, which was measured in the same manner as in Example 1, was 82.0%, and a volume energy density of the power generating element with respect to the 2nd cycle, which was measured in the same manner as in Example 1, was 26.5 mAh/cm$^3$. The results are presented in Table 2.

Example 17

A nonaqueous electrolytic storage element of Example 17 was assembled in the same manner as in Example 11, provided Positive Electrode C was replaced with Positive Electrode D, and Negative Electrode A was replaced with Negative Electrode C.

The charging-discharging cycles were performed on the obtained nonaqueous electrolytic storage element in the same manner as in Example 11. A capacity ratio (a capacity of the negative electrode/a capacity of the positive electrode) was 4.0, a pore volume ratio (a pore volume of the negative electrode/a pore volume of the positive electrode) was 3.38, and a pore volume ratio (a pore volume of the positive electrode/a pore volume of the separator) was 1.27.

A capacity maintaining rate of the nonaqueous electrolytic storage element after 50 cycles, which was measured in the same manner as in Example 1, was 83.9%, and a volume energy density of the power generating element with respect to the 2nd cycle, which was measured in the same manner as in Example 1, was 33.0 mAh/cm$^3$. The results are presented in Table 2.

Example 18

A nonaqueous electrolytic storage element of Example 18 was assembled in the same manner as in Example 11, provided Positive Electrode C was replaced with Positive Electrode D, and Negative Electrode A was replaced with Negative Electrode O.

The charging-discharging cycles were performed on the obtained nonaqueous electrolytic storage element in the same manner as in Example 11. A capacity ratio (a capacity of the negative electrode/a capacity of the positive electrode) was 6.05, a pore volume ratio (a pore volume of the negative electrode/a pore volume of the positive electrode) was 1.61, and a pore volume ratio (a pore volume of the positive electrode/a pore volume of the separator) was 1.27.

A capacity maintaining rate of the nonaqueous electrolytic storage element after 50 cycles, which was measured in the same manner as in Example 1, was 80.7%, and a volume energy density of the power generating element with respect to the 2nd cycle, which was measured in the same manner as in Example 1, was 34.5 mAh/cm$^3$. The results are presented in Table 2.

Comparative Example 4

A nonaqueous electrolytic storage element of Comparative Example 4 was assembled in the same manner as in Example 11, provided that Negative Electrode A was replaced with Negative Electrode J.

The charging-discharging cycles were performed on the obtained nonaqueous electrolytic storage element in the same manner as in Example 11. A capacity ratio (a capacity of the negative electrode/a capacity of the positive electrode) was 1.98, a pore volume ratio (a pore volume of the negative electrode/a pore volume of the positive electrode) was 0.53, and a pore volume ratio (a pore volume of the positive electrode/a pore volume of the separator) was 1.44.

A capacity maintaining rate of the nonaqueous electrolytic storage element after 50 cycles, which was measured in the same manner as in Example 1, was 15.0%, and a volume energy density of the power generating element with respect to the 2nd cycle, which was measured in the same manner as in Example 1, was 45.6 mAh/cm$^3$. The results are presented in Table 2.

Compared to Examples 11 to 16, reduction in the capacity was large in Comparative Example 4. It was assumed that the large reduction in the capacity was caused probably because the nonaqueous electrolyte could not sufficiently supplied due to the reduction in the pore volume ratio (the pore volume of the negative electrode/the pore volume of the positive electrode).

Comparative Example 5

A nonaqueous electrolytic storage element of Comparative Example 5 was assembled in the same manner as in Example 11, provided that Negative Electrode A was replaced with Negative Electrode K.

The charging-discharging cycles were performed on the obtained nonaqueous electrolytic storage element in the same manner as in Example 11.

A capacity ratio (a capacity of the negative electrode/a capacity of the positive electrode) was 2.96, a pore volume ratio (a pore volume of the negative electrode/a pore volume of the positive electrode) was 0.80, and a pore volume ratio (a pore volume of the positive electrode/a pore volume of the separator) was 1.44.

A capacity maintaining rate of the nonaqueous electrolytic storage element after 50 cycles, which was measured in the same manner as in Example 1, was 49.4%, and a volume energy density of the power generating element with respect to the 2nd cycle, which was measured in the same manner as in Example 1, was 43.3 mAh/cm$^3$. The results are presented in Table 2.

Compared to Examples 11 to 16, reduction in the capacity was large in Comparative Example 5. It was assumed that the large reduction in the capacity was caused probably because the nonaqueous electrolyte could not sufficiently supplied due to the reduction in the pore volume ratio (the pore volume of the negative electrode/the pore volume of the positive electrode).

Conditions of the nonaqueous electrolytic storage elements of Examples 1 to 18 and Comparative Examples 1 to 5 are summarized in Tables 1-1 to 1-4 below.

TABLE 1-1

| | Type of positive electrode | Capacity of positive electrode (mAh/cm$^2$) | Average thickness of positive electrode material layer (cm) | Average thickness of separator (cm) |
|---|---|---|---|---|
| Ex. 1 | A | 0.45 | 0.0074 | 0.002 |
| Ex. 2 | A | 0.45 | 0.0074 | 0.01 |
| Ex. 3 | A | 0.45 | 0.0074 | 0.002 |
| Ex. 4 | A | 0.45 | 0.0074 | 0.002 |
| Comp. Ex. 1 | A | 0.45 | 0.0074 | 0.002 |
| Comp. Ex. 2 | A | 0.45 | 0.0074 | 0.002 |
| Ex. 5 | B | 0.45 | 0.0052 | 0.002 |
| Ex. 6 | B | 0.45 | 0.0052 | 0.002 |
| Ex. 7 | B | 0.45 | 0.0052 | 0.002 |
| Ex. 8 | B | 0.45 | 0.0052 | 0.01 |
| Ex. 9 | B | 0.45 | 0.0052 | 0.002 |
| Ex. 10 | B | 0.45 | 0.0052 | 0.002 |
| Comp. Ex. 3 | B | 0.45 | 0.0052 | 0.002 |
| Ex. 11 | C | 0.45 | 0.0043 | 0.002 |
| Ex. 12 | C | 0.45 | 0.0043 | 0.002 |
| Ex. 13 | C | 0.45 | 0.0043 | 0.002 |
| Ex. 14 | C | 0.45 | 0.0043 | 0.01 |
| Ex. 15 | C | 0.45 | 0.0043 | 0.002 |
| Ex. 16 | C | 0.45 | 0.0043 | 0.002 |
| Comp. Ex. 4 | C | 0.45 | 0.0043 | 0.002 |
| Comp. Ex. 5 | C | 0.45 | 0.0043 | 0.002 |
| Ex. 17 | D | 0.44 | 0.0041 | 0.002 |
| Ex. 18 | D | 0.44 | 0.0041 | 0.002 |

TABLE 1-2

| | Type of negative electrode | Capacity of negative electrode (mAh/cm$^2$) | Average thickness of negative electrode material layer (cm) | Capacity ratio (capacity of negative electrode/capacity of positive electrode) |
|---|---|---|---|---|
| Ex. 1 | C | 1.79 | 0.0079 | 4.00 |
| Ex. 2 | C | 1.79 | 0.0079 | 4.00 |
| Ex. 3 | D | 2.68 | 0.0119 | 5.99 |
| Ex. 4 | E | 4.47 | 0.0198 | 9.98 |
| Comp. Ex. 1 | A | 0.91 | 0.0044 | 2.02 |
| Comp. Ex. 2 | B | 1.35 | 0.0059 | 3.01 |
| Ex. 5 | A | 0.91 | 0.0044 | 2.02 |
| Ex. 6 | B | 1.35 | 0.0041 | 3.01 |
| Ex. 7 | G | 1.79 | 0.0055 | 4.00 |
| Ex. 8 | G | 1.79 | 0.0055 | 4.00 |
| Ex. 9 | H | 2.69 | 0.0083 | 6.00 |
| Ex. 10 | I | 4.53 | 0.0138 | 10.11 |
| Comp. Ex. 3 | F | 0.9 | 0.0028 | 2.00 |
| Ex. 11 | A | 0.91 | 0.0044 | 2.02 |
| Ex. 12 | B | 1.35 | 0.0059 | 3.01 |
| Ex. 13 | L | 1.78 | 0.0046 | 3.97 |
| Ex. 14 | L | 1.78 | 0.0046 | 3.97 |
| Ex. 15 | M | 2.67 | 0.0069 | 5.97 |
| Ex. 16 | N | 4.45 | 0.0115 | 9.94 |
| Comp. Ex. 4 | J | 0.89 | 0.0023 | 1.98 |
| Comp. Ex. 5 | K | 1.33 | 0.0035 | 2.98 |
| Ex. 17 | C | 1.79 | 0.0079 | 4.000 |
| Ex. 18 | O | 2.66 | 0.0066 | 6.08 |

TABLE 1-3

| | Electrode element volume (cm³, with diameter of 16 mm) | Porosity of positive electrode material layer | Pore volume of positive electrode (mm³/cm²) | Porosity of negative electrode material layer |
|---|---|---|---|---|
| Ex. 1 | 0.0348 | 0.65 | 4.81 | 0.65 |
| Ex. 2 | 0.0509 | 0.65 | 4.81 | 0.65 |
| Ex. 3 | 0.0427 | 0.65 | 4.81 | 0.65 |
| Ex. 4 | 0.0586 | 0.65 | 4.81 | 0.65 |
| Comp. Ex. 1 | 0.0277 | 0.65 | 4.81 | 0.65 |
| Comp. Ex. 2 | 0.0308 | 0.65 | 4.81 | 0.65 |
| Ex. 5 | 0.0232 | 0.50 | 2.59 | 0.65 |
| Ex. 6 | 0.0228 | 0.50 | 2.59 | 0.65 |
| Ex. 7 | 0.0256 | 0.50 | 2.59 | 0.50 |
| Ex. 8 | 0.0416 | 0.50 | 2.59 | 0.50 |
| Ex. 9 | 0.0311 | 0.50 | 2.59 | 0.50 |
| Ex. 10 | 0.0422 | 0.50 | 2.59 | 0.50 |
| Comp. Ex. 3 | 0.0200 | 0.50 | 2.59 | 0.50 |
| Ex. 11 | 0.0215 | 0.40 | 1.73 | 0.65 |
| Ex. 12 | 0.0246 | 0.40 | 1.73 | 0.65 |
| Ex. 13 | 0.0220 | 0.40 | 1.73 | 0.40 |
| Ex. 14 | 0.0381 | 0.40 | 1.73 | 0.40 |
| Ex. 15 | 0.0266 | 0.40 | 1.73 | 0.40 |
| Ex. 16 | 0.0359 | 0.40 | 1.73 | 0.40 |
| Comp. Ex. 4 | 0.0173 | 0.40 | 1.73 | 0.40 |
| Comp. Ex. 5 | 0.0196 | 0.40 | 1.73 | 0.40 |
| Ex. 17 | 0.0281 | 0.37 | 1.52 | 0.65 |
| Ex. 18 | 0.0255 | 0.37 | 1.52 | 0.37 |

TABLE 1-4

| | Pore volume of negative electrode (mm³/cm²) | Pore volume ratio (negative electrode pore volume/ positive electrode pore volume) | Pore volume of separator (mm³/cm²) | Pore volume ratio (positive electrode pore volume/ Separator pore volume) |
|---|---|---|---|---|
| Ex. 1 | 5.14 | 1.07 | 1.20 | 4.01 |
| Ex. 2 | 5.14 | 1.07 | 6.00 | 0.80 |
| Ex. 3 | 7.7 | 1.60 | 1.20 | 4.01 |
| Ex. 4 | 12.84 | 2.67 | 1.20 | 4.01 |
| Comp. Ex. 1 | 2.84 | 0.59 | 1.20 | 4.01 |
| Comp. Ex. 2 | 3.85 | 0.80 | 1.20 | 4.01 |
| Ex. 5 | 2.84 | 1.10 | 1.20 | 2.16 |
| Ex. 6 | 2.7 | 1.04 | 1.20 | 2.16 |
| Ex. 7 | 2.77 | 1.07 | 1.20 | 2.16 |
| Ex. 8 | 2.77 | 1.07 | 6.00 | 0.43 |
| Ex. 9 | 4.15 | 1.60 | 1.20 | 2.16 |
| Ex. 10 | 6.91 | 2.67 | 1.20 | 2.16 |
| Comp. Ex. 3 | 1.38 | 0.53 | 1.20 | 2.16 |
| Ex. 11 | 2.84 | 1.65 | 1.20 | 1.44 |
| Ex. 12 | 3.85 | 2.23 | 1.20 | 1.44 |
| Ex. 13 | 1.84 | 1.07 | 1.20 | 1.44 |
| Ex. 14 | 1.84 | 1.07 | 6.00 | 0.29 |
| Ex. 15 | 2.77 | 1.60 | 1.20 | 1.44 |
| Ex. 16 | 4.61 | 2.67 | 1.20 | 1.44 |
| Comp. Ex. 4 | 0.92 | 0.53 | 1.20 | 1.44 |
| Comp. Ex. 5 | 1.38 | 0.80 | 1.20 | 1.44 |
| Ex. 17 | 5.14 | 3.38 | 1.20 | 1.26 |
| Ex. 18 | 2.44 | 1.61 | 1.20 | 1.26 |

TABLE 2-1

| | Capacity at 2$^{nd}$ cycle (mAh) | Volume energy density of power generating element (mAh/cm³) | Capacity at 50$^{th}$ cycle (mAh) | Volume energy density of power generating element after 50 cycle (mAh/cm³) |
|---|---|---|---|---|
| Ex. 1 | 0.88 | 25.3 | 0.79 | 22.8 |
| Ex. 2 | 0.88 | 17.3 | 0.85 | 16.7 |
| Ex. 3 | 0.93 | 21.8 | 0.84 | 19.6 |
| Ex. 4 | 0.95 | 16.2 | 0.86 | 14.6 |
| Comp. Ex. 1 | 0.82 | 29.6 | 0.45 | 16.3 |
| Comp. Ex. 2 | 0.86 | 27.9 | 0.56 | 18.1 |
| Ex. 5 | 0.87 | 37.4 | 0.62 | 26.7 |
| Ex. 6 | 0.91 | 40.0 | 0.80 | 35.1 |
| Ex. 7 | 0.94 | 36.8 | 0.82 | 32.0 |
| Ex. 8 | 0.94 | 22.6 | 0.90 | 21.6 |
| Ex. 9 | 0.94 | 30.2 | 0.81 | 26.0 |
| Ex. 10 | 0.95 | 22.5 | 0.82 | 19.3 |
| Comp. Ex. 3 | 0.95 | 47.5 | 0.29 | 14.5 |
| Ex. 11 | 0.9 | 41.9 | 0.64 | 29.8 |
| Ex. 12 | 0.9 | 36.6 | 0.64 | 26.0 |
| Ex. 13 | 0.8 | 36.4 | 0.60 | 27.3 |
| Ex. 14 | 0.8 | 21.0 | 0.69 | 18.1 |
| Ex. 15 | 0.9 | 33.8 | 0.72 | 27.1 |
| Ex. 16 | 0.95 | 26.5 | 0.78 | 21.7 |
| Comp. Ex. 4 | 0.79 | 45.6 | 0.12 | 6.8 |
| Comp. Ex. 5 | 0.85 | 43.3 | 0.42 | 21.4 |
| Ex. 17 | 0.93 | 33.0 | 0.78 | 27.7 |
| Ex. 18 | 0.88 | 34.5 | 0.71 | 27.8 |

TABLE 2-2

| | Capacity maintaining rate after 50 cycles (%) | Evaluation of capacity maintaining rate |
|---|---|---|
| Ex. 1 | 90.0 | A |
| Ex. 2 | 96.6 | A |
| Ex. 3 | 90.0 | A |
| Ex. 4 | 90.0 | A |
| Comp. Ex. 1 | 55.0 | B |
| Comp. Ex. 2 | 65.0 | B |
| Ex. 5 | 71.3 | A |
| Ex. 6 | 87.8 | A |
| Ex. 7 | 87.0 | A |
| Ex. 8 | 95.7 | A |
| Ex. 9 | 85.9 | A |
| Ex. 10 | 86.0 | A |
| Comp. Ex. 3 | 30.6 | B |
| Ex. 11 | 71.1 | A |
| Ex. 12 | 71.1 | A |
| Ex. 13 | 75.0 | A |
| Ex. 14 | 86.3 | A |
| Ex. 15 | 80.0 | A |
| Ex. 16 | 82.0 | A |
| Comp. Ex. 4 | 15.0 | B |
| Comp. Ex. 5 | 49.4 | B |
| Ex. 17 | 83.9 | A |
| Ex. 18 | 80.7 | A |

The embodiments of the present invention are, for example, as follows:

<1> A nonaqueous electrolytic storage element, containing:
a positive electrode, which contains a positive electrode material layer including a positive electrode active material capable of reversibly accumulating and releasing anions;
a negative electrode, which contains a negative electrode material layer including a negative electrode active material capable of reversibly accumulating and releasing cations;
a separator provided between the positive electrode and the negative electrode; and
a nonaqueous electrolyte containing an electrolyte salt,
wherein a pore volume of the negative electrode material layer per unit area of the negative electrode is larger than a pore volume of the positive electrode material layer per unit area of the positive electrode.

<2> The nonaqueous electrolytic storage element according to <1>, wherein the pore volume of the negative electrode material layer per unit area of the negative electrode is 1.05 times to 5 times the pore volume of the positive electrode material layer per unit area of the positive electrode.

<3> The nonaqueous electrolytic storage element according to any of <1> or <2>, wherein V1, V2, and V3 satisfy the following relationship:

$$V3<V1<V2$$

where V1 is the pore volume of the positive electrode material layer per unit area of the positive electrode, V2 is the pore volume of the negative electrode material layer per unit area of the negative electrode, and V3 is a pore volume per unit area of the separator.

<4> The nonaqueous electrolytic storage element according to any one of <1> to <3>, wherein a porosity of the positive electrode material layer is 0.4 to 0.7, and a porosity of the negative electrode material layer is 0.4 to 0.7.

<5> The nonaqueous electrolytic storage element according to any one of <1> to <4>, wherein a capacity per unit area of the negative electrode is larger than a capacity per unit area of the positive electrode.

<6> The nonaqueous electrolytic storage element according to <5>, wherein the capacity per unit area of the negative electrode is 2 times to 6 times the capacity per unit area of the positive electrode.

<7> The nonaqueous electrolytic storage element according to any one of <1> to <6>, wherein a maximum voltage of the nonaqueous electrolytic storage element during charging and discharging is 4.3 V to 6.0 V.

<8> The nonaqueous electrolytic storage element according to any one of <1> to <7>, wherein an amount of the electrolyte salt in the nonaqueous electrolyte is 3 mol/L or greater.

<9> The nonaqueous electrolytic storage element according to any one of <1> to <8>, wherein the positive electrode active material is a carbonaceous material.

<10> The nonaqueous electrolytic storage element according to any one of <1> to <9>, wherein the negative electrode active material is a carbonaceous material.

REFERENCE SIGNS LIST 1 positive electrode
2 negative electrode
3 separator
4 outer tin
5 negative electrode lead wire
6 positive electrode lead wire
10 nonaqueous electrolytic storage element

The invention claimed is:

1. A nonaqueous electrolytic storage element, comprising:
a positive electrode, which contains a positive electrode material layer including a positive electrode active material capable of reversibly accumulating and releasing anions;
a negative electrode, which contains a negative electrode material layer including a negative electrode active material capable of reversibly accumulating and releasing cations;
a separator provided between the positive electrode and the negative electrode; and
a nonaqueous electrolyte containing an electrolyte salt,
wherein a pore volume of the negative electrode material layer per unit area of the negative electrode is larger than a pore volume of the positive electrode material layer per unit area of the positive electrode,
wherein a porosity of the positive electrode material layer is 0.5 to 0.65, and a porosity of the negative electrode material layer is 0.5 to 0.65, and
wherein said nonaqueous electrolytic storage element is charged by accumulating anions to the positive electrode and accumulating cations to the negative electrode,
wherein the positive electrode active material and the negative electrode active material are composed of a carbonaceous material and an electroconductive agent composed of acetylene black.

2. The nonaqueous electrolytic storage element according to claim 1, wherein the pore volume of the negative electrode material layer per unit area of the negative electrode is 1.05 times to 5 times the pore volume of the positive electrode material layer per unit area of the positive electrode.

3. The nonaqueous electrolytic storage element according to claim 1, wherein V1, V2, and V3 satisfy the following relationship:

$$V3<V1<V2$$

where V1 is the pore volume of the positive electrode material layer per unit area of the positive electrode, V2 is the pore volume of the negative electrode material layer per unit area of the negative electrode, and V3 is a pore volume per unit area of the separator.

4. The nonaqueous electrolytic storage element according to claim 1, wherein a capacity per unit area of the negative electrode is larger than a capacity per unit area of the positive electrode.

5. The nonaqueous electrolytic storage element according to claim 4, wherein the capacity per unit area of the negative electrode is 2 times to 6 times the capacity per unit area of the positive electrode.

6. The nonaqueous electrolytic storage element according to claim 1, wherein a maximum voltage of the nonaqueous electrolytic storage element during charging and discharging is 4.3 V to 6.0 V.

7. The nonaqueous electrolytic storage element according to claim 1, wherein an amount of the electrolyte salt in the nonaqueous electrolyte is 3 mol/L or greater.

8. The nonaqueous electrolytic storage element according to claim 1,
wherein an amount of the electrolyte salt in the nonaqueous electrolyte is 3 mol/L or greater.

9. The nonaqueous electrolytic storage element according to claim 1, wherein a capacity per unit area of the negative electrode is 2 times to 6 times a capacity per unit area of the positive electrode, and wherein an amount of the electrolyte salt in the nonaqueous electrolyte is 3 mol/L or greater.

* * * * *